US008835665B2

(12) United States Patent
Reaney et al.

(10) Patent No.: US 8,835,665 B2
(45) Date of Patent: Sep. 16, 2014

(54) RECOVERY OF MULTIPLE COMPOUNDS AND RECYCLABLE WATER FROM THIN STILLAGE

(75) Inventors: Martin J. Reaney, Saskatoon (CA); Yunhua Jia, Saskatoon (CA); Jianheng Shen, Saskatoon (CA); Komsulee Ratanapariyanuch, Saskatoon (CA)

(73) Assignee: University of Saskatchewan, Saskatoon (CA)

( * ) Notice: Subject to any disclaimer, the term of this patent is extended or adjusted under 35 U.S.C. 154(b) by 530 days.

(21) Appl. No.: 12/995,660

(22) PCT Filed: Jun. 2, 2009

(86) PCT No.: PCT/CA2009/000719
§ 371 (c)(1),
(2), (4) Date: Feb. 10, 2011

(87) PCT Pub. No.: WO2009/146526
PCT Pub. Date: Dec. 10, 2009

(65) Prior Publication Data
US 2011/0130586 A1    Jun. 2, 2011

Related U.S. Application Data

(60) Provisional application No. 61/129,057, filed on Jun. 2, 2008.

(51) Int. Cl.
C07F 9/09 (2006.01)
C07C 211/27 (2006.01)
A23K 1/06 (2006.01)
C12F 3/10 (2006.01)

(52) U.S. Cl.
CPC .... *C12F 3/10* (2013.01); *A23K 1/06* (2013.01)
USPC .......................................... 558/146; 564/374

(58) Field of Classification Search
None
See application file for complete search history.

(56) References Cited

U.S. PATENT DOCUMENTS

| | | | |
|---|---|---|---|
| 5,177,008 A | 1/1993 | Kampen | |
| 5,177,009 A | 1/1993 | Kampen | |
| 5,250,182 A | 10/1993 | Bento et al. | |
| 5,250,719 A | 10/1993 | Tronconi | |
| 5,316,782 A | 5/1994 | Zimlich | |
| 5,356,812 A * | 10/1994 | Matsuyama et al. | 435/280 |
| 5,433,833 A | 7/1995 | de Ferra et al. | |
| 5,919,991 A | 7/1999 | Subbiah | |
| 5,965,780 A | 10/1999 | Savina et al. | |
| 7,009,076 B2 | 3/2006 | Paananen et al. | |
| 7,465,791 B1 * | 12/2008 | Hallberg et al. | 530/500 |
| 2004/0082044 A1 | 4/2004 | Prevost et al. | |
| 2004/0115779 A1 | 6/2004 | Olsen et al. | |
| 2006/0006116 A1 | 1/2006 | Scheimann et al. | |
| 2006/0041152 A1 | 2/2006 | Cantrell et al. | |

FOREIGN PATENT DOCUMENTS

| | | |
|---|---|---|
| CA | 2642838 A1 | 8/2007 |
| EP | 0411780 | 2/1991 |
| WO | WO 2007010892 A1 * | 1/2007 |
| WO | 2007056321 A1 | 5/2007 |
| WO | WO 2009108748 A2 * | 9/2009 |

OTHER PUBLICATIONS

Extended European Search Report of European Patent Application No. 09756988.3 dated Jul. 19, 2012.
Kim, Youngmi, et al., "Composition of corn dry-grind ethanol by-products: DDGS, wet cake and thin stillage", Bioresource Technology, Aug. 1, 2008, vol. 99, No. 12, pp. 5165-5176.

* cited by examiner

*Primary Examiner* — Samantha Shterengarts
*Assistant Examiner* — Amanda L Aguirre
(74) *Attorney, Agent, or Firm* — Bereskin & Parr LLP/S.E.N.C.R.L., s.r.l.; Patricia Folkins

(57) ABSTRACT

Methods for recovery of recyclable water and/or fermentation co-products from thin stillage process streams. Microbial metabolites plant derivatives and/or plant extractives are removed from thin stillage after which water is recovered and recycled. Thin stillage is commingled with polar organic solvents or with oil to react microbial metabolites, plant derivatives and/or plant extractives. The reacted organic solvents are then separated from the processed thin stillage. Thin stillage may be commingled with an oil to re act with certain organic compounds, after which, the reacted oil is separated from the processed thin stillage is further extracted with one or more polar organic solvents. Alternatively, thin stillage may be first processed with one or more polar organic solvents, and then processed with an oil. Useful organic compounds may be recovered from the reacted oil and reacted organic solvents.

11 Claims, 35 Drawing Sheets

1. Glycerol
2. Lactic acid
3. Acetic acid
4. Betaine
5. Succinic acid
6. Ethanol
7. GPC 1. Glycerol
2. Lactic acid
3. Acetic acid
4. Ethanol
5. Betaine
6. GPC
7. PEA 1. Glycerol
2. Lactic acid
3. Acetic acid
4. Ethanol

RECOVERY OF MULTIPLE COMPOUNDS AND RECYCLABLE WATER FROM THIN STILLAGE

TECHNICAL FIELD

The present invention generally relates to methods for the recovery of recyclable water and fermentation co-products from thin stillage process streams.

BACKGROUND ART

Fermentation production of short chain alcohols from high-starch feedstocks such as grains and tubers, generally comprises the steps of pulverizing the feedstocks, liquifaction and saccharification of starch components in the pulverized feedstocks into fermentable sugars by enzymatic hydrolysis, and then fermenting the sugars with a suitable microorganism to produce a "beer" or "mash". The beer generally comprises alcohol, water, solubilized organic compounds produced during fermentation, and "solids" which include un-metabolized starch moieties, non-starch plant debris, and dead microbial cells. The solubilized organic compounds in fermentation beers include microbial metabolic products generally comprising organic compounds, as well as plant extractives and plant derivatives produced during enzymatic hydrolysis of the pulverized feedstocks. All of these components comprising beers are commonly referred to as fermentation co-products.

Some commercial fermentation processes are conducted in a single vessel wherein the enzymatic hydrolysis step, also referred to as saccharification, and fermentation step are combined and occur simultaneously. Such processes are commonly known as "simultaneous saccharification and fermentation" (SSF). Other commercial processes separate the saccharification and fermentation components into sequential steps that are conducted in separate vessels.

The beers produced from fermentation of high-starch feedstocks generally comprise about 5% to 7% alcohol. The alcohol product is recovered from the other products produced during fermentation, by distillation. The post-distillation residual materials represent about 90% to 95% of the fermentation products, and are commonly referred to as "whole stillage". Whole stillage is typically separated into a solids fraction and a liquid fraction by centrifugation. The solids fraction is commonly referred to as a "wet cake" which is then further de-watered and dried to produce "Distillers Dried Grains" (DDG). DDG is used directly as animal feed and/or indirectly as feed supplements. The liquid fraction separated from whole stillage is commonly referred to as "thin stillage" and represents the largest volume output from commercial fermentation operations. Various commercial practices are used to dispose of thin stillage. In some cases, the water component of thin stillage is evaporated to produce a syrup which is then added to DDG to increase its nutrient value. In some commercial operations, thin stillage is recycled into saccharification and fermentation tanks or alternatively, into SSF tanks as a source of additional water. In this type of application, the recycled thin stillage is referred to as "backset". Alternatively, thin stillage may simply be collected, evaporated and discharged into waste disposal systems.

Depending on the type of high-starch feedstock provided to the fermentation process and the type of fermentative microorganism(s) employed, thin stillage generally comprises a wide range of yeast metabolites, monosaccharides, di-saccharides, organic compounds released from plant materials during enzymatic hydrolysis and incompletely digested plant debris. Thin stillage components may include glycerol, ethanol, lactose, glucose, arabinitol ribitol, various non-nitrogenous and nitrogenous acids, polyhydroxyl alcohols, amino acids and proteins. Large-scale commercial fermentations generally experience some degree of bacterial contamination that usually does not negatively affect the enzymatic and biological processes. However, the presence of contaminating bacteria in the saccharification and fermentation tanks results in the significant production of bacterial metabolites such as acetic acid, lactic acid, and various organic acids. These metabolites end up in the thin stillage. At high levels, these bacterial metabolites are known to inhibit enzyme activities and microbial metabolism. Problems commonly encountered in commercial fermentations relate to the elevated concentrations of these types of bacterial metabolites in recycled thin stillage, i.e., backset, causing significant reductions in the rates of enzymatic hydrolysis in saccharification tanks, and in fermentation rates. Other problems associated with these bacterial metabolites are their known inhibitory effects on rumen bacteria, and therefore, the digestion and metabolism of DDG amended with thin stillage syrups by livestock may negatively affected.

SUMMARY OF THE INVENTION

Some exemplary embodiments of the present invention relate to methods for recovery of recyclable water from thin stillage process outputs from fermentation production of short-chain alcohols from high-starch feedstocks. Fermentation co-products are separated from thin stillage after which, recyclable water is recovered from the processed thin stillage. The recovered water is recyclable into one or more of the liquifaction and saccharification process step and the fermentation process step.

The fermentation co-products generally comprise microbial metabolites, plant extractives, and plant derivatives. Certain aspects of the exemplary embodiments pertain to recover of the separated fermentation co-products.

Some aspects of the exemplary embodiments pertain to de-watering of the thin stillage process outputs prior to separation of fermentation co-products therefrom.

Some exemplary embodiments of the present invention relate to methods for separation and recovery of organic compounds from the thin stillage process outputs from fermentation production systems. Such organic compounds comprise generally comprise microbial metabolites, plant extractives, and plant derivatives. Microbial metabolites as used herein refer to yeast metabolites and/or bacterial metabolites produced during saccharification and fermentation steps. Exemplary microbial metabolites include 2-phenylethanol, α-glycerylphosphorylcholine, glycerol, betaine, succinic acid, ethanol, isopropanol, acetic acid, lactic acid, betaine, succinic acid, 1,3-propanediol, 3 hydroxypropanal, and 3-hydroxypropanoic acid, and combinations thereof. Exemplary plant derivatives include monosaccharides and di-saccharides.

Certain aspects of the exemplary embodiments pertain to methods for separation and recovery of α-glycerylphosphorylcholine from thin stillage process streams. Some aspects pertain to recovery of 2-phenethanol from thin stillage process streams. Other aspects pertain to concurrent recovery of α-glycerylphosphorylcholine and 2-phenethanol from thin stillage process streams.

Some exemplary embodiments of the present invention relate to methods for separation and recovery of inhibitory compounds from thin stillage process outputs front fermentation production systems. Inhibitory compounds are comprise certain microbial metabolites exemplified by 2-phenylethanol, ethanol, isopropanol, acetic acid, lactic acid, 1,3-propanediol, 3 hydroxypropanal, and 3-hydroxypropanoic acid, and combinations thereof. Water recovered from the processed thin stillage is suitable for recycling into one or more of the liquifaction and saccharification process step and the fermentation process step. The de-watered processed thin stillage is suitable for commingling with dried distillers grains.

BRIEF DESCRIPTION OF THE DRAWINGS

Exemplary embodiments of the present invention are be described in conjunction with reference to the following drawings, in which.

DETAILED DESCRIPTION OF THE INVENTION

The exemplary embodiments of the present invention generally relate to methods for recovery of recyclable water and fermentation co-products from thin stillage process streams.

Figure 1:
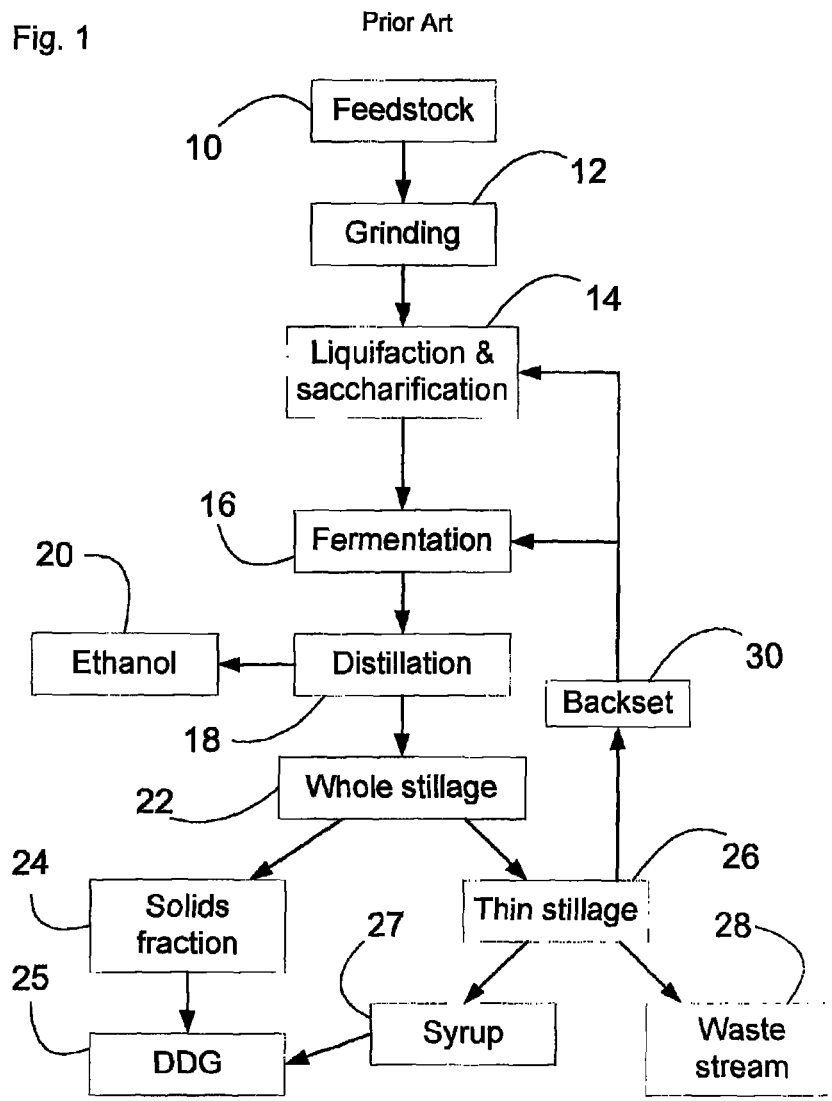
FIG. 1 is a flow chart illustrating an exemplary prior art fermentation process for production of ethanol.
Figure 2:
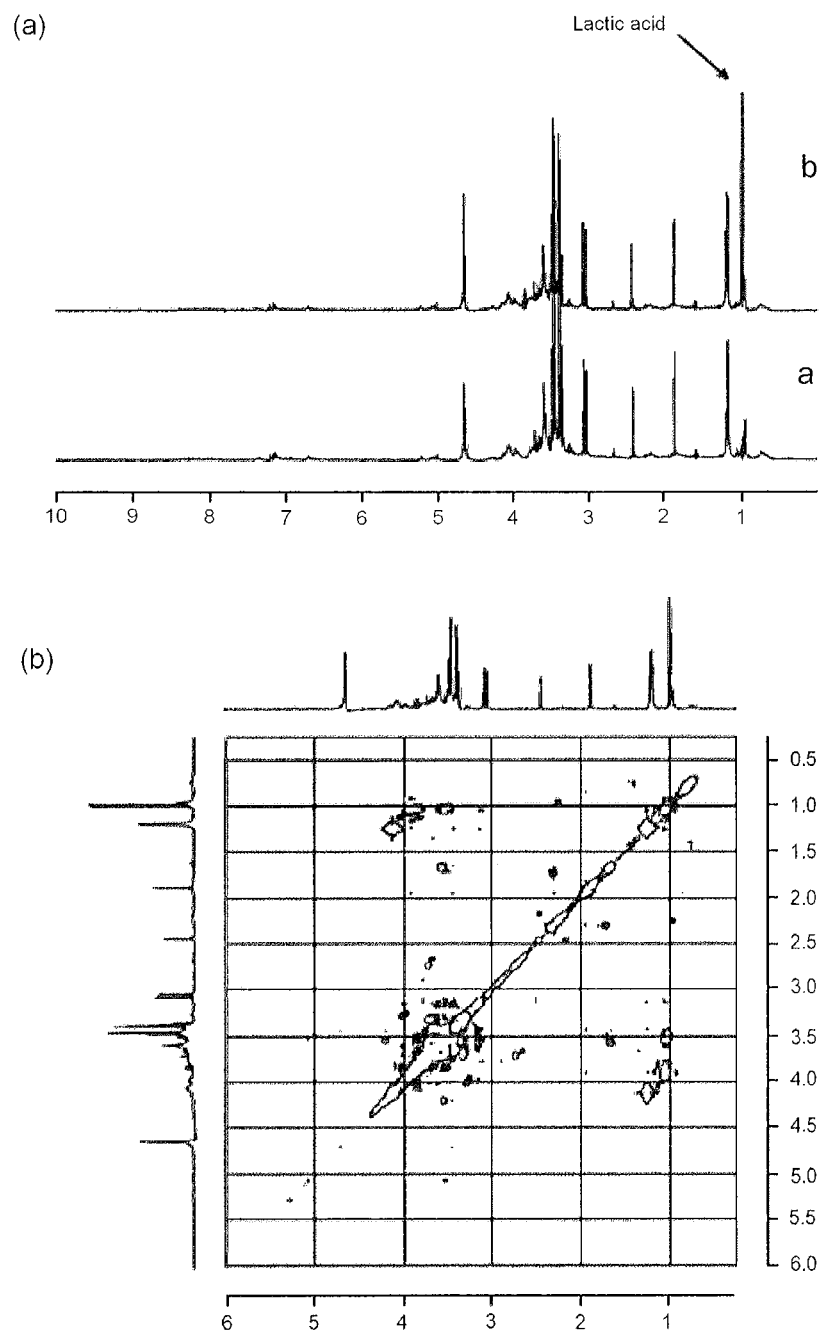
FIG. 2 (a) is a $^1$H-NMR spectrum of thin stillage "a" without added lactic acid and "b" with added lactic acid, and (b) is a two-dimensional $^1$H-NMR spectra of thin stillage with added lactic acid.
Figure 3:
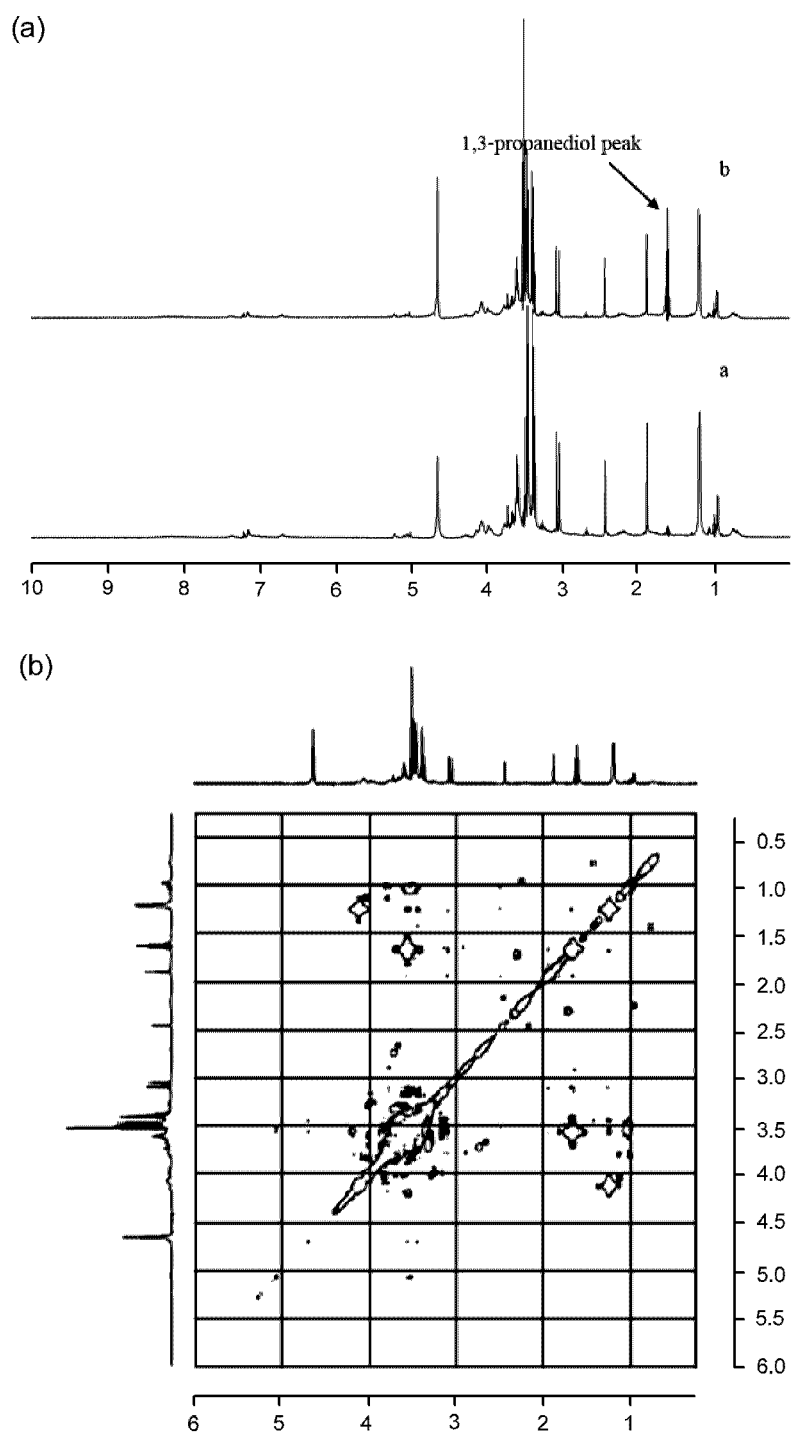
FIG. 3 (a) is a $^1$H-NMR spectrum of thin stillage "a" without added 1,3-propanediol and "b" with added 1,3-propanediol, and (b) is a two-dimensional $^1$H-NMR spectra of thin stillage with added 1,3-propanediol.
Figure 4:
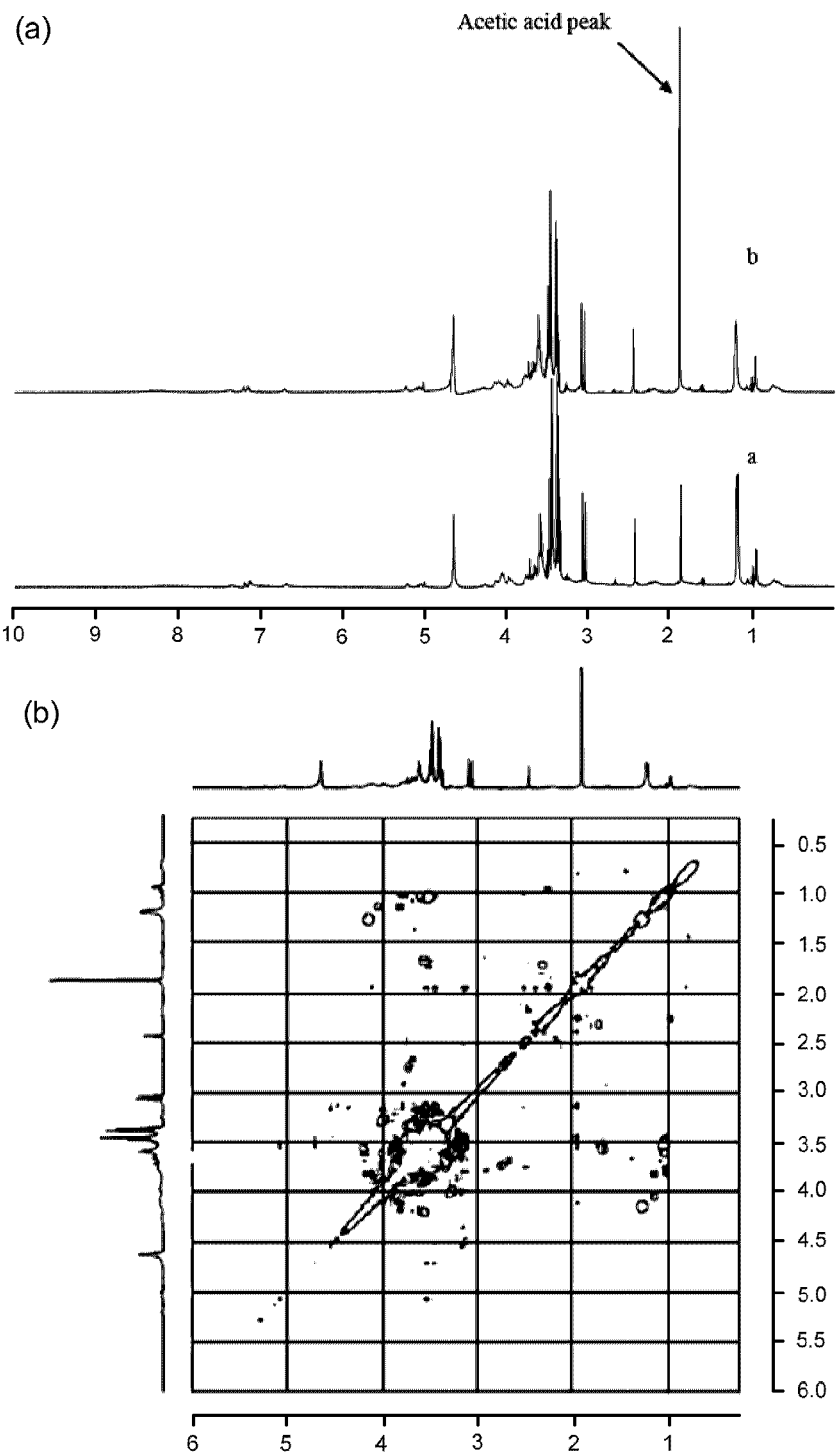
FIG. 4 (a) is a $^1$H-NMR spectrum of thin stillage "a" without added acetic acid and "b" with added acetic acid, and (b) is a two-dimensional $^1$H-NMR spectra of thin stillage with added acetic acid.

An exemplary prior art process for production of ethanol from grains and tubers is shown in FIG. 1. A selected high-starch feed stock 10 exemplified by corn, wheat, barley, rye, sorghum, potato, cassava and the like, is ground and/or pulverized 12 to expose and make the starch components more accessible to enzymatic hydrolysis. The pulverized feedstock is then suspended in water to which are added suitable enzymes known to those skilled in these arts, for liquifaction and saccharification 14 of the starch moieties in the feedstock. It is optional to add water to the liquifaction and saccharification step to facilitate mixing of the suspension during enzymatic hydrolysis to enhance enzyme performance and complete digestion of the feedstock. An active culture of a suitable fermentative microorganism is added to the scarified suspension for fermentation 16 of the monosaccharides to produce fermentation beer which comprises short-chain alcohols such as ethanol, butanol and propanol, fermentation co-products comprising solubilized organic compounds produced during fermentation, and "solids" which include un-metabolized starch moieties, non-starch plant debris, and dead microbial cells. The fermentation broth also comprises yeast metabolites, monosaccharides, di-saccharides, organic compounds released from plant materials during enzymatic hydrolysis and incompletely digested plant debris. Since it is common for large-scale industrial fermentations to be contaminated by opportunistic bacteria, the fermentation beers produced may also contain bacterial metabolites. After fermentation has been completed, the fermentation beer is transferred to a distillation apparatus wherein the short-chain alcohol products exemplified bb ethanol 20 are separated and recovered from the beer by distillation 18. The whole stillage 22 process stream is centrifuged to separate a solids fraction 24 which is dried to produce DDG 25. The thin stillage 28 liquids fraction separated by centrifugation may be recycled as backset 30 into the liquifaction and saccharification step 14 and/or the fermentation step 16. Alternatively or additionally, the thin stillage 26 may be dried down to remove water thereby producing a syrup 27 which may be commingled with the DDG 25. Alternatively or additionally, the thin stillage 28 may be discarded as a waste stream 28.

Such fermentation processes are being increasingly used to produce short-chain alcohols that are suitable for use as fuels for internal combustion engines or alternatively, as fuel supplements for petroleum-based fuels. The production of fuel alcohols enables the use of selected nitrogen compounds as yeast nutritives that result in the production of certain metabolites that accumulate in the beers, and end up in the thin stillage fractions after distillation of the beer and centrifugation of whole stillage. However, such nitrogen compounds are also rapidly utilized by bacterial contaminants and the resulting metabolites also tend to accumulate in thin stillage fractions. Known yeast and bacterial metabolites commonly present as fermentation co-products in thin stillage include 2-phenethanol (PEA), glycerol, isopropanol, acetic acid, lactic acid, and 1,3-propanediol. These organic compounds are concentrated in thin stillage syrups produced b) de-watering.

Some exemplary embodiments of the present invention relate to methods for separation of yeast-derived and bacterial-derived fermentation co-products from thin stillage Certain exemplary embodiments relate to separation and purification of selected fermentation co-products comprising high-value small-molecule organic compounds. The separated organic compounds may be characterized using 1D and 2D nuclear magnetic resonance (NMR) spectroscopy and/or thin-layer chromatography.

During the practice of some of the exemplary methods of the present invention, we surprisingly discovered that thin stillage process streams recovered from fermentation production using high-starch feedstocks, comprise significant amounts of α-glycerylphosphorylcholine (GPC). GPC is known to be isolated from raw deacylated mixtures obtained by deacylation of raw soy and egg lecithins: from biological materials such as dry beef pancreas and autolyzed pancreas; and from tissues of fresh frog and rabbit heart muscle. GPC is typically synthesized by the reaction of isopropylidene-glycerol with 2-chloro-2oxa-3,3,2-dioxophospholan at temperatures between about 0° C. and 10° C. in an aprotic solvent. The resulting ester is treated with trimethylamine in an aprotic solvent at about ambient temperature followed by hydrolysis in acid aqueous solution. The resulting crude compound is purified by a column of IRC-50 type and crystallized from ethanol. Purification of GPC from the above sources typically comprises elution on cationic resins in the H form and in non-aqueous medium and removal of impurities by washing with methanol and then with water. The resulting aqueous solution contains a mixture of compounds from which pure GPC is obtained by removing GPE and GPS on strong basic resins in an aqueous medium. GPC is a known precursor in the biosynthesis of brain phospholipids. GPC is also known to increase the bioavailability of choline in nervous tissue. The significant improvement on cognitive symptoms makes choline alphoscerate different from other cholinergic precursors such as choline or lecithin. This compound considered as relatively new cholinergic precursor, a centrally acting parasympathomimetic drug in dementia disorder and in acute cerebrovascular disease. The build-up of GPC in the cell has been associated with a number of disease processes including cancer and Alzheimer disease. In addition, GPC has been implicated in diverse cellular functions such as maintenance of renal osmolarity, inhibition of lysophospholipase activity, and inhibition of phosphatidyl inositol transfer protein alpha. GPC is known for its use in moisturizers, emollients, elasticizes, restitutives and the like, nutritive cream, and topical cosmetical or pharmaceutical compositions. GPC has very low systemic toxicity as well as a particularly low topical toxicity. GPC has been used in drug combinations with an acetylcholinesterase (AChE) inhibitor (such as rivastigmine, donepexil) in the treatment of cognitive disorders specific to adults, including Alzheimer's disease. This drug combination permits the use of smaller doses of AChE inhibitors resulting in a reduced incidence of side and/or toxic effects typically suffered on long-term treatment with AChE inhibitors PC has further been used as an active ingredient in the manufacture of functional foods. However, it was previously not known that GPC accumulated as a fermentation co-product in thin stillage process streams. Accordingly, some exemplary embodiments of the present invention relate to methods for recovery of GPC from thin stillage process streams.

Other exemplary embodiments of the present invention relate to methods for recovery of multiple organic chemicals from thin stillage process streams concurrent with recovery of recyclable water. Some organic chemicals are metabolites produced by yeast cells during fermentation of monosaccharides produced from liquifaction and saccharification of high-starch feedstocks. Such organic chemicals are exemplified by glycerol, 2-phenylethanol, α-glycerylphosphorylcholine, betaine, ethanol, isopropanol, succinic acid, and 3-hydroxypropanoic acid. Some organic chemicals are metabolites produced by bacterial cells that may have contaminated the saccharification and/or fermentation processes. Such organic chemicals are exemplified by acetic acid, lactic acid, betaine, 1,3-propanediol, 3 hydroxypropanal. Certain embodiments pertain to concurrent recovery and separation of multiple organic chemicals from thin stillage process streams.

Some ethanol production plants recycle a portion of the thin stillage produced in order to conserve water. However, this recycling of thin stillage results in accumulations of incompletely digested plant products, yeast metabolites, bacterial metabolites and solids comprising plant debris and dead microbial cells in the saccharification and fermentation process steps and, in the and has been found to cause a reduction in fermentation activity. Several components present in the thin stillage, are known to be inhibitory to yeast fermentation, and in some cases may cause fouling and corrosion of heat exchangers and other process equipment present in ethanol production facilities.

One embodiment of the present invention relates to methods for recovering recyclable water from thin stillage. In one aspect, the method relates to the separation of at least one of yeast metabolites, microbial metabolites, and combinations thereof from thin stillage. In one another aspect, the method relates to the separation of organic compounds that act as fermentation inhibitors from thin stillage. In a further aspect, the method relates to the separation of compounds that act as rumen microbe inhibitors from thin stillage. In another aspect, the method further relates to the recovery of at least one of the yeast metabolites, microbial metabolites, fermentation inhibitors, rumen microbe inhibitors, and combinations thereof.

Organic compounds in the thin stillage, for example microbial metabolites such as acetic, propionic and lactic acids, and yeast metabolites such as PEA that act as fermentation inhibitors are linked to significant decreases in fermentation activity, more specifically in least fermentation activity, and even more specifically in yeast growth rates. The removal of these compounds that act as fermentation inhibitors prior to the recycling of thin stillage, enables more effective and efficient fermentation processes, and more specifically enables more cost effective ethanol fuel production processes. In addition, separation and further recovery of the yeast metabolites and microbial metabolites present in thin stillage provide for the recovery of valuable compounds that may have significant commercial value. Accordingly, some exemplary embodiments of the present invention relate to separation and recovery of at least one of yeast metabolites and bacterial metabolites from thin stillage. In one aspect, at least one of the yeast metabolites 2-phenylethanol (PEA), α-glycerylphosphorylcholine (GPC), and glycerol is separated and recovered from thin stillage. In another aspect, at least one of bacterial metabolites isopropanol, acetic acid, lactic acid, and 1,3-propanediol is separated and recovered from thin stillage.

The methods of the present invention generally comprise separation of thin stillage into a thin stillage condensate and a thin stillage syrup. Suitable processes are exemplified by evaporation of water from the thin stillage to produce a syrup, and recovery of the evaporated water by condensation. Alternatively, thin stillage may be centrifuged to decant water from the thin stillage solids which are the dried by sublimation to yield a thin stillage syrup, also referred to as still bottoms. Alternatively, thin stillage may be centrifuged and concentrated into thin stillage syrup under a vacuum by evaporation. The decanted water is condensed and recovered as thin stillage condensates.

Exemplary methods for separating and recovering organic compounds from tin stillage syrups generally comprise a first step of commingling the thin stillage syrups with a solvent in which GPC is not soluble. Such solvents are exemplified by acetone. Acetone-soluble compounds extractable from thin stillage syrup include glycerol, succinic acid, acetic acid, 1,3-propanediol, lactic acid, betaine and the like. The acetone-insoluble compounds can be recovered by filtration and drying. The acetone comprising dissolved compounds therein can be recovered and the dissolved compounds such as glycerol, succinic acid, acetic acid, 1,3-propanediol, lactic acid, and betaine can be further separated and recovered using processes known to those skilled in these arts. The acetone-insoluble compounds. e.g., GPC can be separated and purified with polar organic solvents exemplified by methanol and ethanol. The residues remaining from the thin stillage slurry after the acetone-solubilized compounds and the polar organic solvent-solubilzed compounds are removed, include polysaccharides, salts, sugars, and proteins. Such residues are suitable for commingling with DDG for increasing the nutritive value of DDG. Certain exemplary embodiments pertain to methods for separating GPC and/or glycerol and/or betaine from the polar organic solvents wherein they were solubilized.

Exemplary methods for separating and recovering organic compounds from thin stillage condensates generally comprise a first step of commingling the thin stillage condensates with dichloromethane (DCM) to solubilize organic compounds exemplified by PEA. Recovery of the DCM extracts significantly reduces the levels of organic compounds in water and makes it suitable for recycling. After drying and desolventization, the PEA enriched residues are suitable for use in other commercial and industrial applications known to those skilled in these arts.

Alternatively, PEA may be recovered from thin stillage condensates by commingling with an oil exemplified by canola oil. PEA is solubilized into the oil fraction and can be separated from the aqueous phase using phase separation processes known to those skilled in these arts. PEA removed in the oil fraction can be extracted by commingling isopropyl alcohol (IPA) with the oil fraction, and then separating the IPA with extracted PEA from the oil. After drying and desolventization using processes known to those skilled in these arts, the PEA-enriched residues are suitable for use in other commercial and industrial applications known to those skilled in these arts.

Some exemplary embodiments of the present invention are described in more detail in the following examples which are not intended nor should be construed as limiting.

EXAMPLES

Methods and Materials

Wheat thin stillage was obtained from a commercial ethanol plant. All other reagents were purchased from commercial sources and were used without further purification. Samples were analyzed by $^1$H-NMR spectroscopy; $^{13}$C-NMR spectroscopy; APT-NMR spectroscopy; 2-dimensional COSY analyses of $^1$H-NMR-$^1$H-NMR correlations; 2-dimensional HMQC analyses of $^1$H-NMR-$^{13}$C-NMR correlations; and thin layer chromatography (TLC). TLC was conducted on precoated silica gel plates (Merck Kieselgel 60F254, 0.25 mm thickness). Compounds present on TLC plates were stained with phosphomolybdic acid solution (25% in ethanol). All NMR spectra were recorded using a Bruker 500 MHz spectrometer. NMR spectra were conducted on samples dissolved in $CDCl_3$, $D_2O$ or MeOD and are referenced to the appropriate solvent signal. Chemical shills are reported in ppm units downfield from tetramethylsilane. HPLC analyses were conducted using a Nova-Pack-C18 60A° column, having a flow rate of 1 mL/minute, an external temperature of 90° C. and an internal temperature of 50° C. The HPLC used a refractive index detector (Waters, Model 2414, Serial number 712-385G) and a pump (Waters, Model 510, serial number 512-140795) having an operating pressure of 1,000 psi.

Example 1

Identification of Organic Compounds Present in Thin Stillage

In order to identify the various components of thin stillage obtained from an ethanol production plant, the thin stillage was clarified by centrifugation.

The components of centrifuged thin stillage were determined using proton NMR analysis. Prior to analysis, samples were passed through a 0.45-μm membrane filter (PTFE membrane filter, Model TF-450, Pall Corporation, Ann Arbor, Mich.). Deuterium oxide and dimethylformamide (DMF) were used as solvent and internal standard, respectively. Since the water peak at around 4.7 ppm was large. NMR proton saturation methods (water suppression) were used to eliminate the water peak (data not shown).

Figure 5:
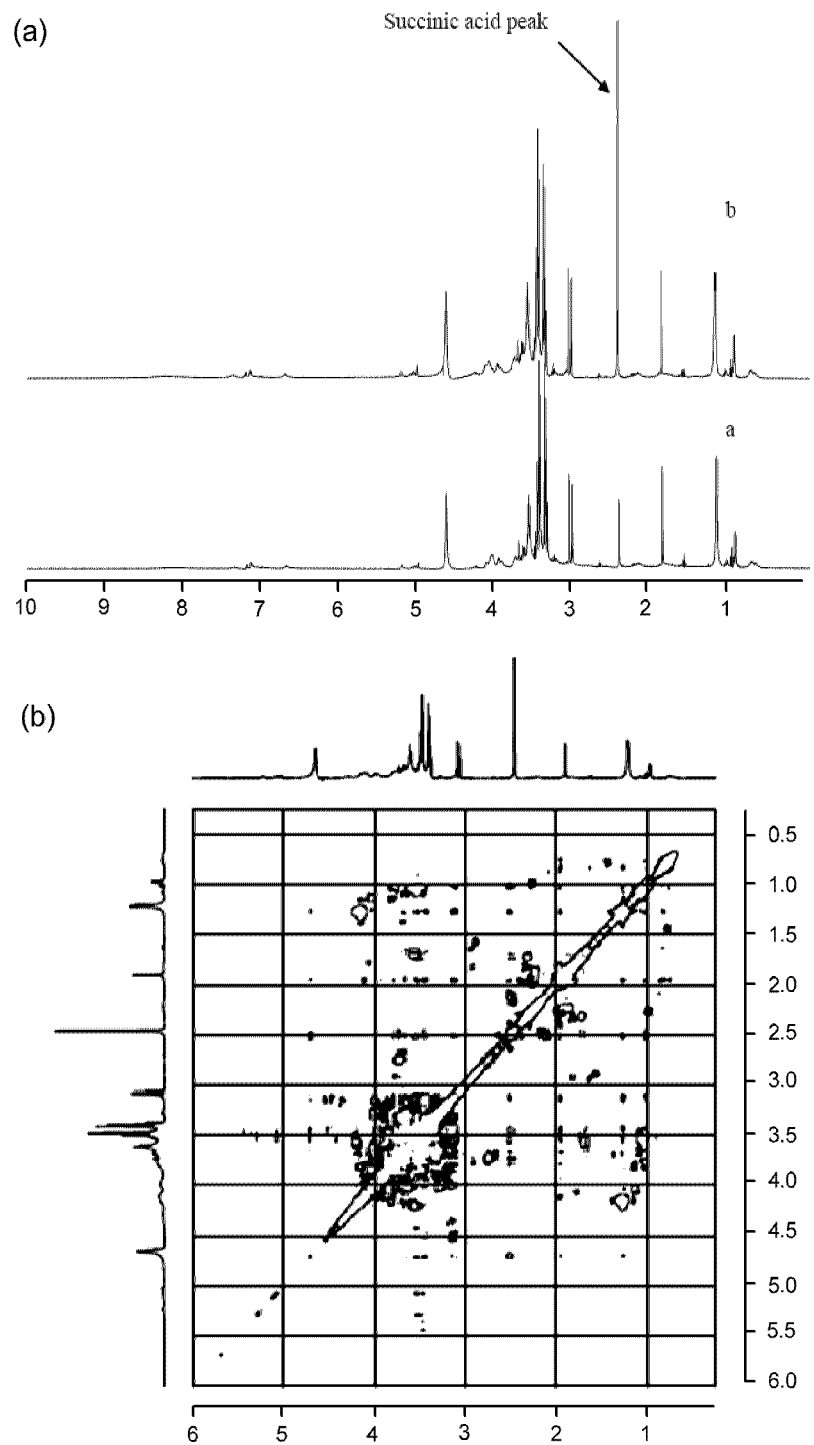
FIG. 5 (a) is a $^1$H-NMR spectrum of thin stillage "a" without added succinic acid and "b" with added succinic acid, and (b) is a two-dimensional $^1$H-NMR spectra of thin stillage with added succinic acid.
Figure 6:
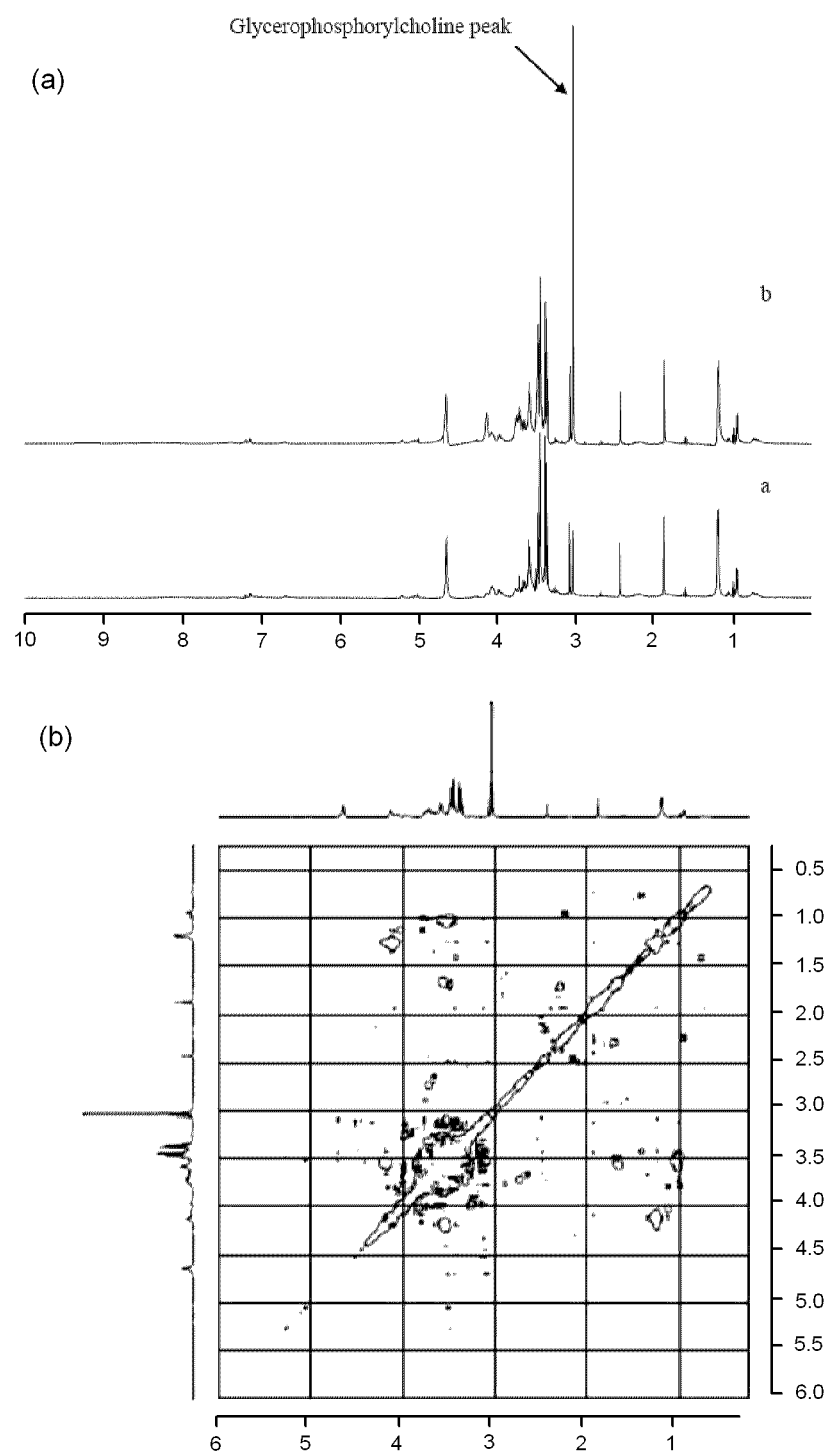
FIG. 6 (a) is a $^1$H-NMR spectrum of thin stillage "a" without added α-glycerylphosphorylcholine and "b" with added α-glycerylphosphorylcholine, and (b) is a two-dimensional $^1$H-NMR spectra of thin stillage with added α-glycerylphosphorylcholine.
Figure 7:
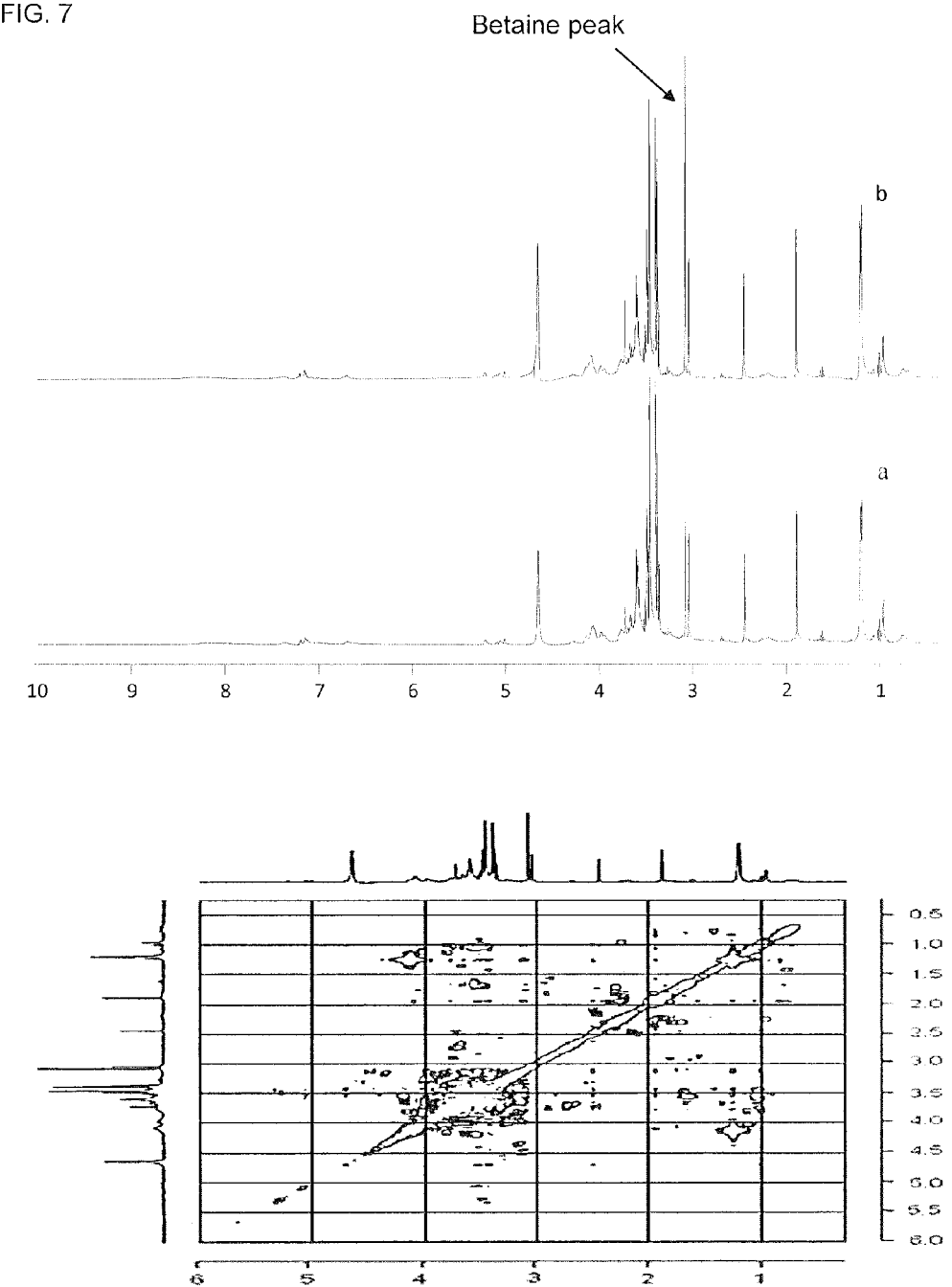
FIG. 7 (a) is a $^1$H-NMR spectrum of thin stillage "a" without added betaine and "b" with added betaine, and (b) is a two-dimensional $^1$H-NMR spectra of thin stillage with added betaine.
Figure 8:
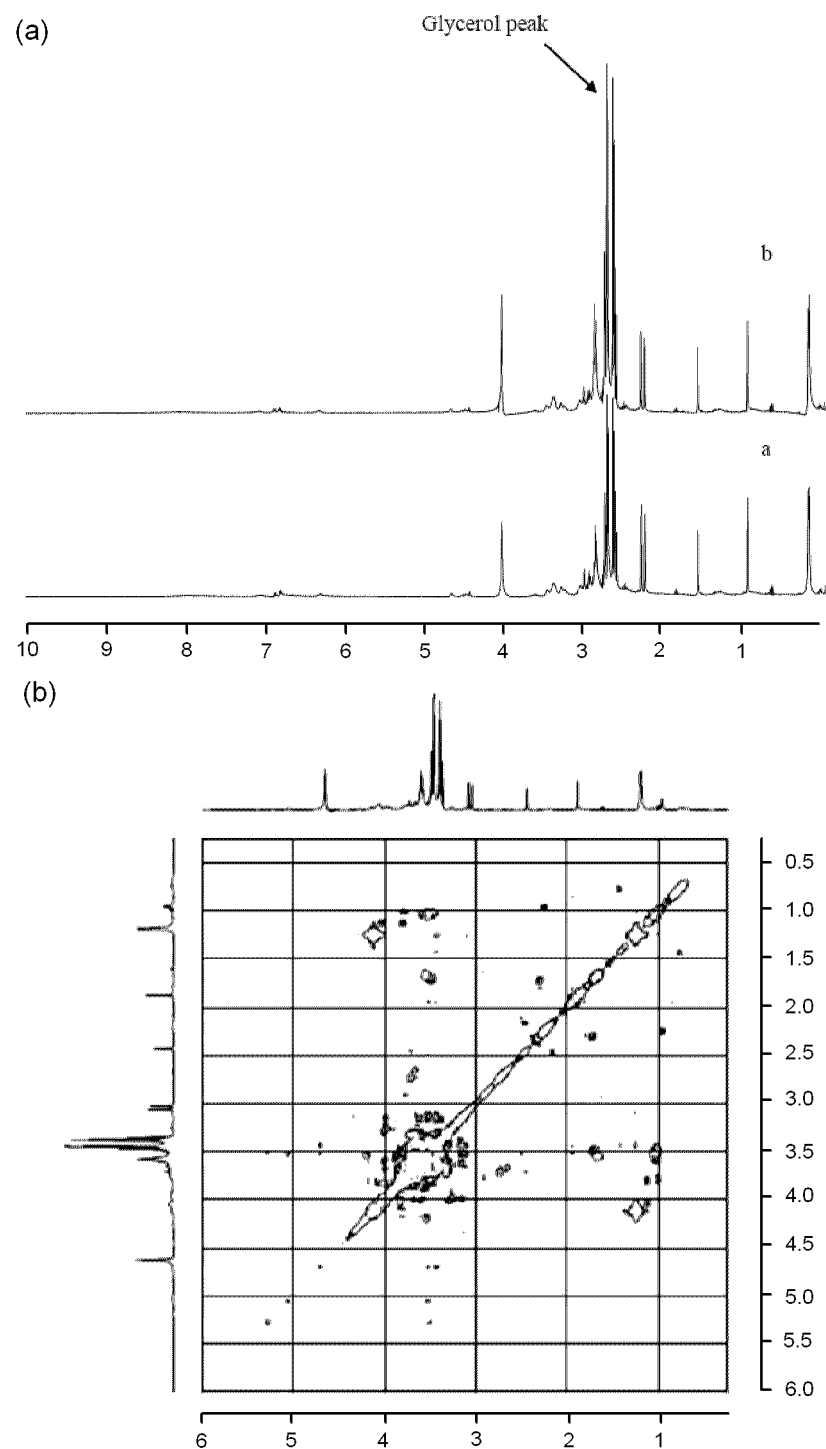
FIG. 8 (a) is a $^1$H-NMR spectrum of thin stillage "a" without added glycerol and "b" with added glycerol, and (b) is a two-dimensional $^1$H-NMR spectra of thin stillage with added glycerol.

The effect of the addition of standard compounds to thin stillage was observed to determine the impact on $^1$H NMR signals. Using $^1$H NMR and the COSY technique (2-D NMR spectrum), the compounds present in the thin stillage were identified. Pure standards of isopropanol, ethanol, lactic acid, 1,3-propanediol, acetic acid, succinic acid, glycerophosphocholine (GPC), betaine, glycerol and phenethyl alcohol were added to particulate-free thin stillage. The $^1$H NMR spectra and 2-D NMR spectra of thin stillage, before and after addition of each of the organic chemicals, were recorded. $^1$H-NMR (1D) spectra were recorded at 500 MHz (Model AMX 500-MHz, NMR Bruker, Missisauga, ON) and the COrrelation SpectroscopY (COSY) technique (2D NMR spectra) was used to identify and confirm the identification of the compounds present in thin stillage, results are shown in FIGS. 2-8. The NMR results were compared with HPLC analysis (column, detector, and pump described below). Samples were passed through a 0.20-μm membrane filter before injection on the HPLC. The proton NMR spectra analysis illustrates that thin stillage includes a plurality of compounds, including lactic acid (FIG. 2); 1,3-propanediol (FIG. 3); acetic acid (FIG. 4); succinic acid (FIG. 5); GPC (FIG. 6); betaine (FIG. 7); glycerol (FIG. 8); as wells as ethanol and isopropanol.

Example 2

Analysis of Components of Dried and Non-Dried Thin Stillage

The organic compounds present in the thin stillage from ethanol production may be concentrated by removing water and concentrating the thin stillage into a thin stillage syrup. There are many suitable methods for removing water to enrich these organic compounds known to those skilled in the art. Analysis of the components of a non-dried thin stillage sample were compared to the components of dried thin stillage samples to determine if the application of a drying process impacted the concentration of various components present within thin stillage. Two drying methods were used, centrifugation and then drying by sublimation to form syrups; and centrifugation and concentration to syrups under vacuum by evaporation. Results from the application of a proton NMR spectra on syrups obtained through both drying methods and a non-dried thin stillage sample were analyzed. The composition and ratios of compounds present in the dried syrups mixture were very similar to the composition and ratios of compounds present in the non-dried thin stillage samples. Exceptions were evident in the concentration of acetic acid, which decreased significantly during the drying process by either method and in the concentration of lactic acid, which increased in samples dried by vacuum evaporation. Thoroughly-dried thin stillage is about 5% by weight of the original liquid thin stillage material.

Example 3

Extraction of Organic Compounds from Thin Stillage

Figure 9:
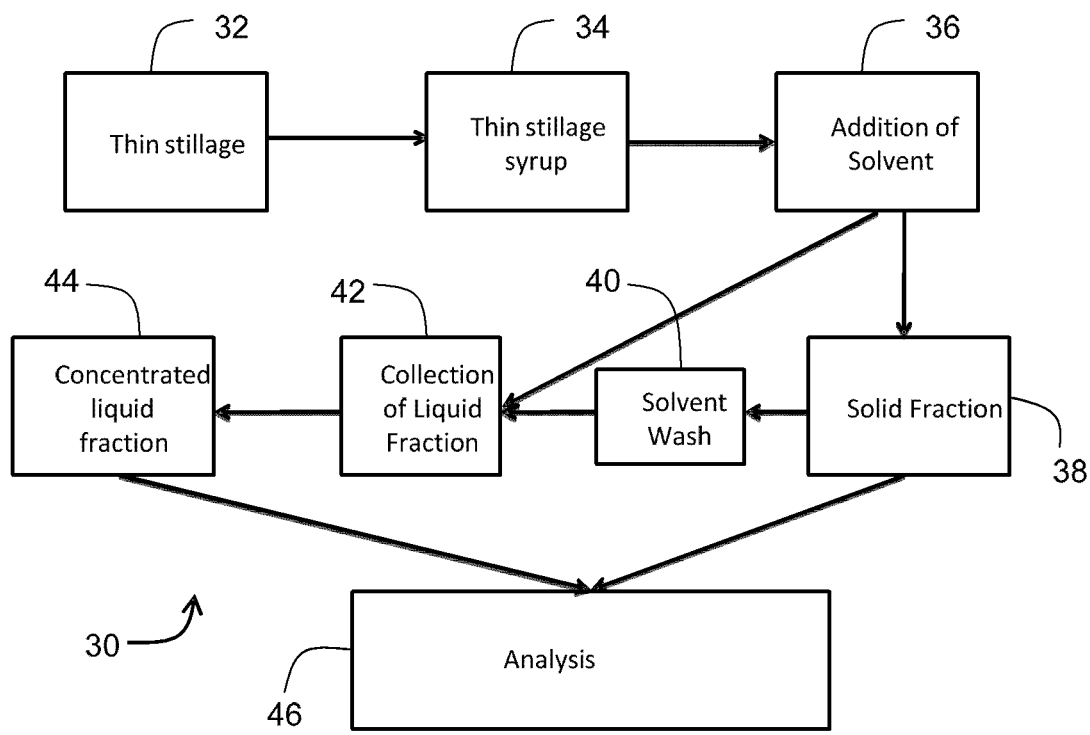
FIG. 9 is a flow chart showing an exemplary method of the present invention for solvent recovery organic compounds from thin stillage.

FIG. 9 shows an exemplary process flow chart 30 used for the recovery or organic compounds from thin stillage 32. Thin stillage 32 was dried was dried using methods known in the art to provide a thin stillage syrup 34. A polar water-miscible solvent was added 36 to the thin stillage syrup 34, and the resulting mixture was separated into a solid fraction 38 and a liquid fraction 40. The solid fraction 38 was subsequently washed 40 using the solvent and the liquid portion of the wash residue was added to the liquid fraction 42. The liquid fraction 42 was then dried to provide a concentrated liquid fraction 44. Each of the concentrated liquid fraction 44 and the solid fraction 38 were analyzed by NMR 46 to identify the various components of each fraction.

In one experiment, thin stillage (about 174.7 g, wet weight) was freeze-dried to produce a thin stillage syrup (about 8.6 g). The resulting thin stillage syrup was mixed with 10 mL methanol by stirring for a period of about one hour. A pale yellow solid fraction was separated from the mixture by filtration under vacuum through a Buchner funnel, collected, and rinsed three times with 10 mL of fresh methanol. The liquid washing residues were combined with the combined liquid methanol fraction. The pooled liquid fraction was evaporated under vacuum yielding a brown liquid fraction. Each of the solid and brown liquid fractions were prepared for proton NMR spectra analysis. The solid fraction comprised about 2% by total weight of the thin stillage. The majority of the solid fraction was composed of sugars and a minor portion of the solid fraction was protein. The brown liquid fraction comprised about 3% of the total weight of thin stillage and was composed of a mixture including glycerol, lactic acid, succinic acid, acetic acid, betaine and GPC (data not shown).

In another experiment, thin stillage (about 561.9 g, wet weight) was evaporated under vacuum at about 70° C. to produce a dried syrup (about 30.4 g) which was subsequently mixed with ethanol at about 65° C. with stirring for a period of about one hour. The resulting pale yellow solid fraction was separated from the mixture by filtration under vacuum through a Buchner funnel, collected, and rinsed about three times with ethanol. The liquid wash residue was combined with the combined liquid ethanol fraction, and the resulting clear brown ethanol solution was evaporated under vacuum, yielding a brown liquid. Both solid and liquid fractions were prepared for $^1$H-NMR analysis. The solid fraction comprised about 2.6% of total thin stillage weight. The major component of the solids fraction was sugars and the minor component was protein. In addition, the solid fraction contained trace amounts of betaine and GPC. The brown liquid fraction comprised about 2.8% of the total weight of thin stillage and was composed of glycerol, lactic acid, succinic acid, acetic acid and betaine and GPC.

In order to identify GPC as the component present in thin stillage, a source of commercially available GPC was used as a control to provide a standard for comparison of the thin stillage fractions identified as GPC. A GPC fraction was isolated from thin stillage, for example by silica-gel column using a solvent system comprising 20% methanol in dichloromethane and 100% methanol after acetylating the mixture containing GPC. The sample of the mixture was prepared in heavy water (D$_2$O) for 1D and 2D NMR analysis, including $^1$H, $^{13}$C, COSY, HMQC and APT. These spectra clearly showed the structure of compound present in thin stillage was in very good agreement with NMR spectra for commercially-available GPC (G5291 from Sigma) indicating the presence of GPC in thin stillage.

Example 4

Separation, Purification and Identification of GPC from Thin Stillage

Thin stillage was lyophilized using methods known in the art. Methanol was then added to the lyophilized thin stillage and the resulting methanol solution was concentrated under a vacuum and loaded onto a thin layer chromatography column (TLC 20-20 cm) to separate the components of the thin stillage mixture. A 30% methanol in dichloromethane solution was used as a developing solvent. The TLC was developed twice in the developing solvent. Five bands, A, B, C, D, E in the order of decreased polarity, were obtained (data not shown). Each band was scraped off the column and placed in sintered glass funnels and subsequently washed with 10 mL of pure methanol. The resulting solutions in each funnel were evaporated under a vacuum and the resulting solids or syrups were prepared for $^1$H-NMR analysis.

Figure 10:
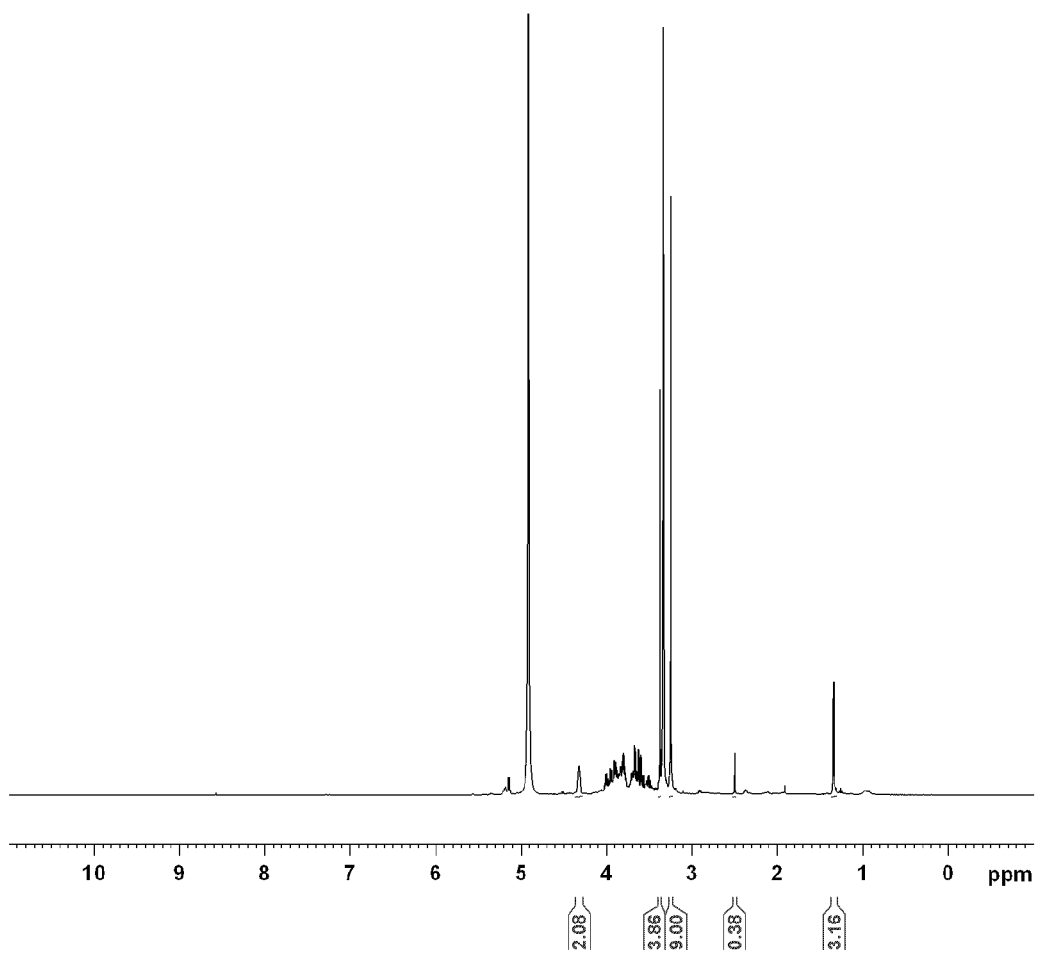
FIG. 10 is a $^1$H-NMR spectrum of the most polar band A of five bands of organic compounds separated from thin stillage according to an exemplary method of the present invention (Example 4)

Based on $^1$H-NMR analysis, the least polar compound (band E) was identified as pure glycerol. Less polar compounds (bands D and C) were identified as lactic acid. Band B was identified as a mixture containing betaine phosphate, small amounts of lactic acid and trace amount of sugars. $^1$H-NMR analysis of the most polar band, band A is shown in FIG. 10. Band A was identified as a mixture compounds containing primarily GPC.

Figure 11:
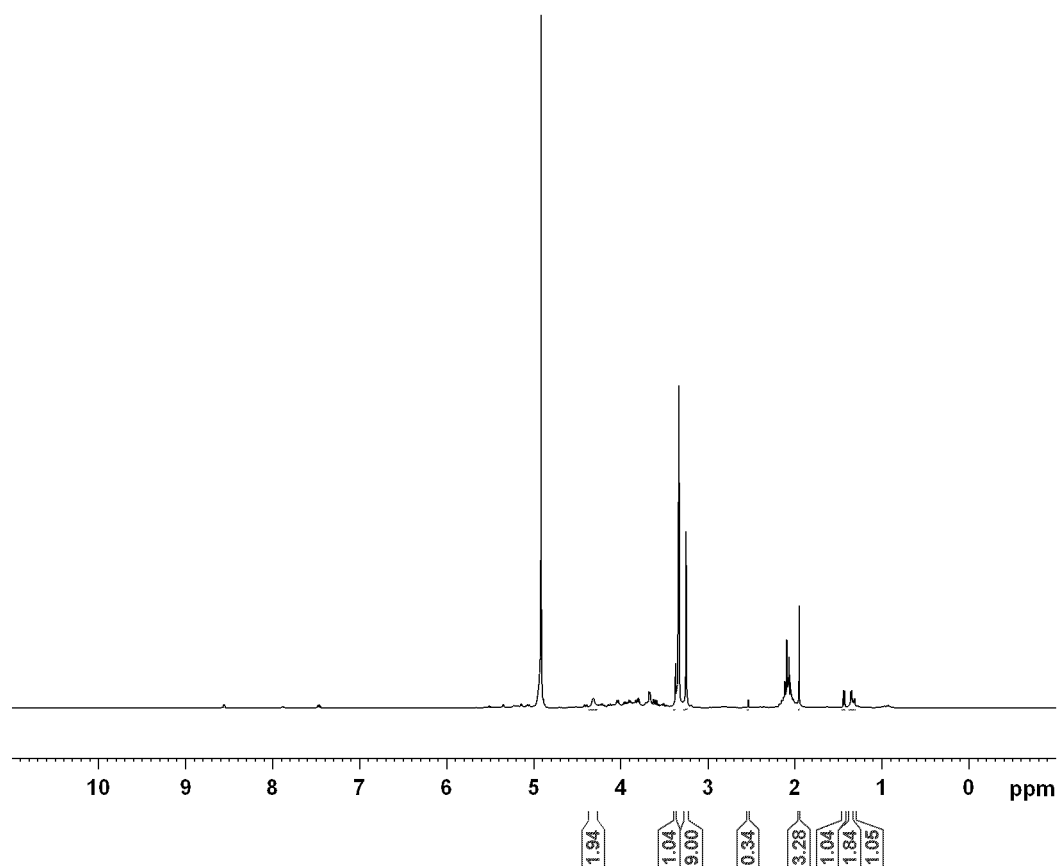
FIG. 11 is a $^1$H-NMR spectrum of separated acetylated products from band A shown in FIG. 10 (Example 4)
Figure 12:
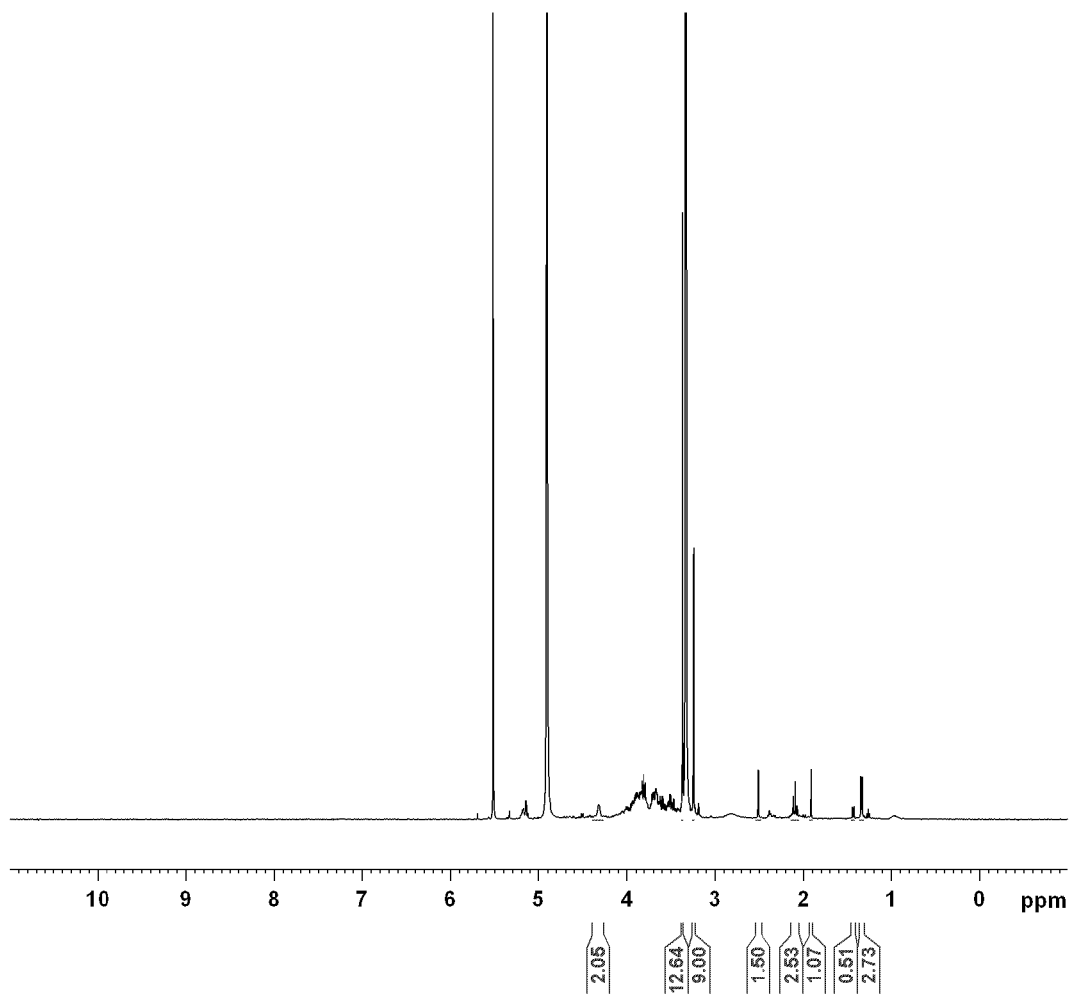
FIG. 12 is a $^1$H-NMR spectrum of a solid product prepared from the separated acetylated products shown in FIG. 11 (Example 4)
Figure 13:
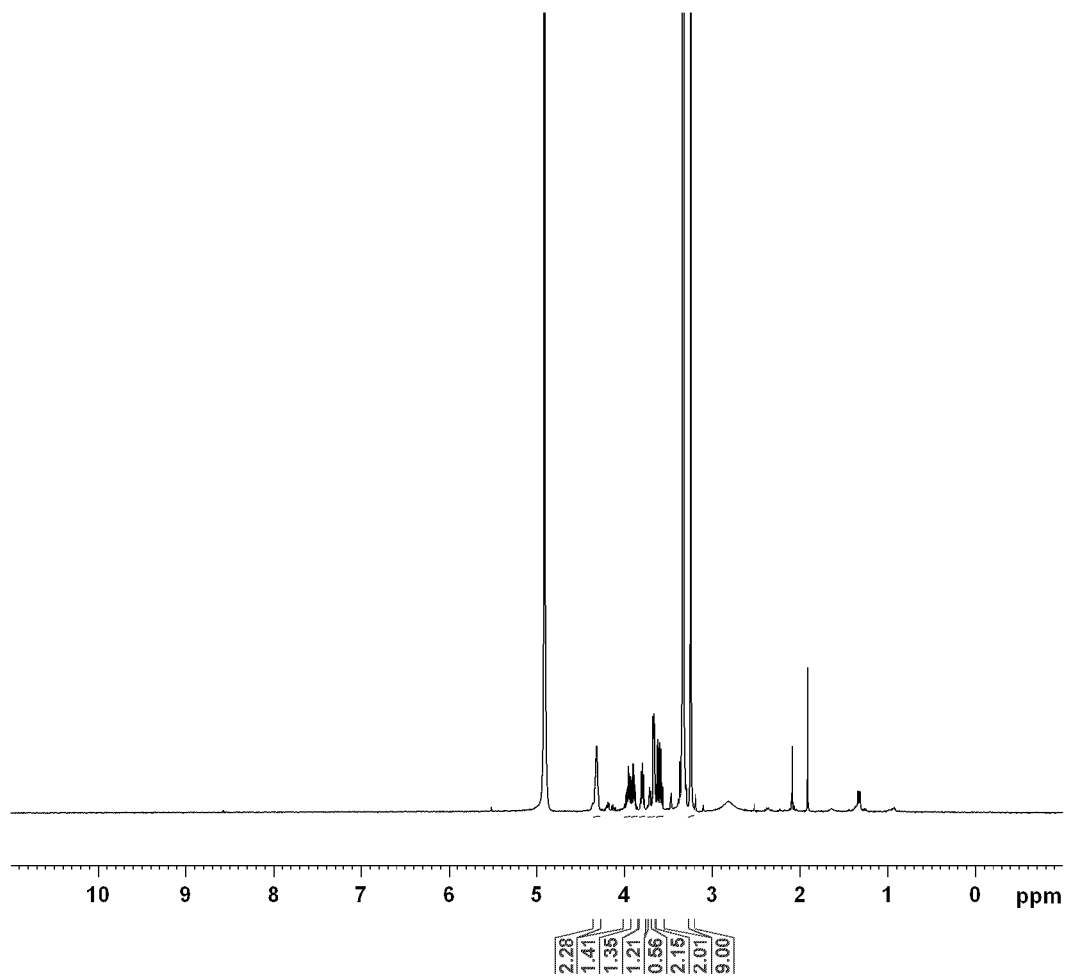
FIG. 13 is a $^1$H-NMR spectrum of a highly-enriched compound prepared from the solid product shown in FIG. 12 (Example 4)
Figure 14:
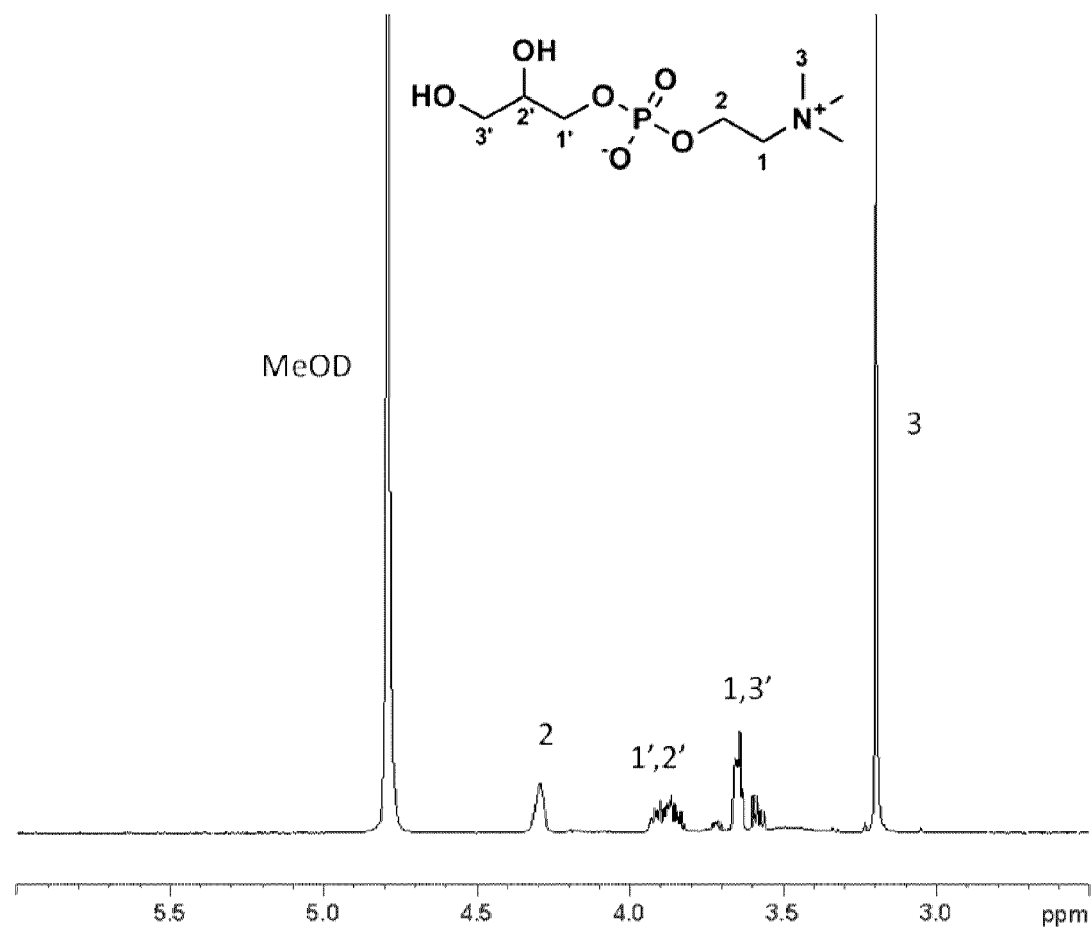
FIG. 14 is a $^1$H-NMR spectrum of the highly-enriched compound shown in FIG. 13 (Example 4)
Figure 15:
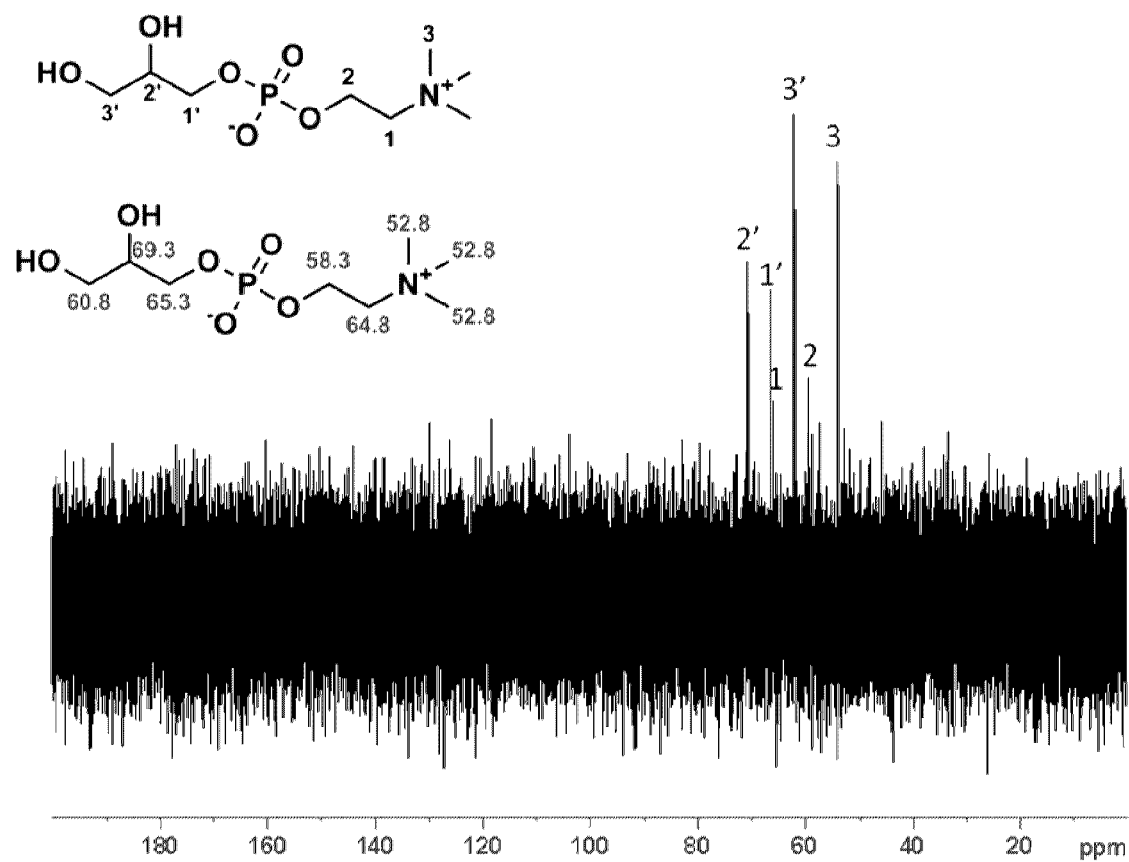
FIG. 15 is a $^{13}$C-NMR spectrum of the highly-enriched compound shown in FIG. 13 (Example 4)
Figure 16:
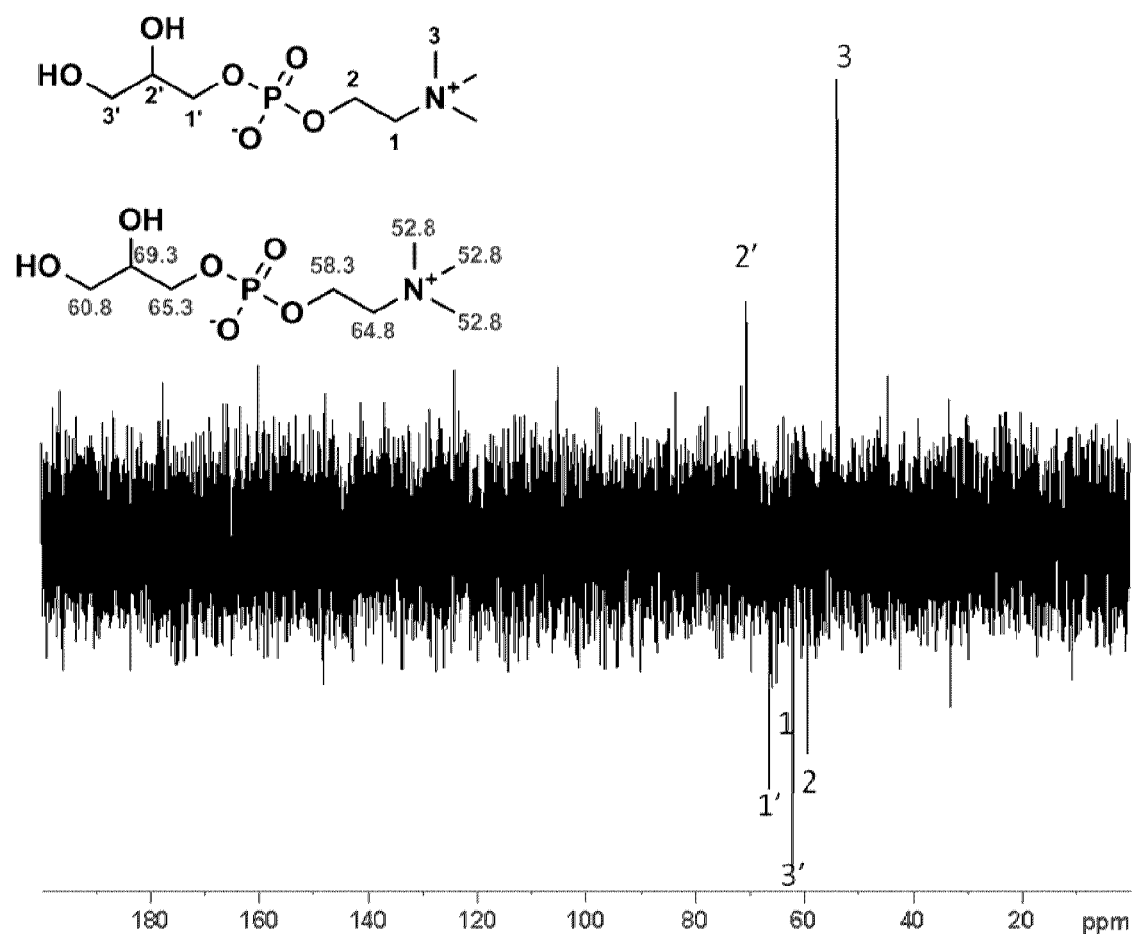
FIG. 16 is a APT-NMR spectrum of the highly-enriched compound shown in FIG. 13 (Example 4)
Figure 17:
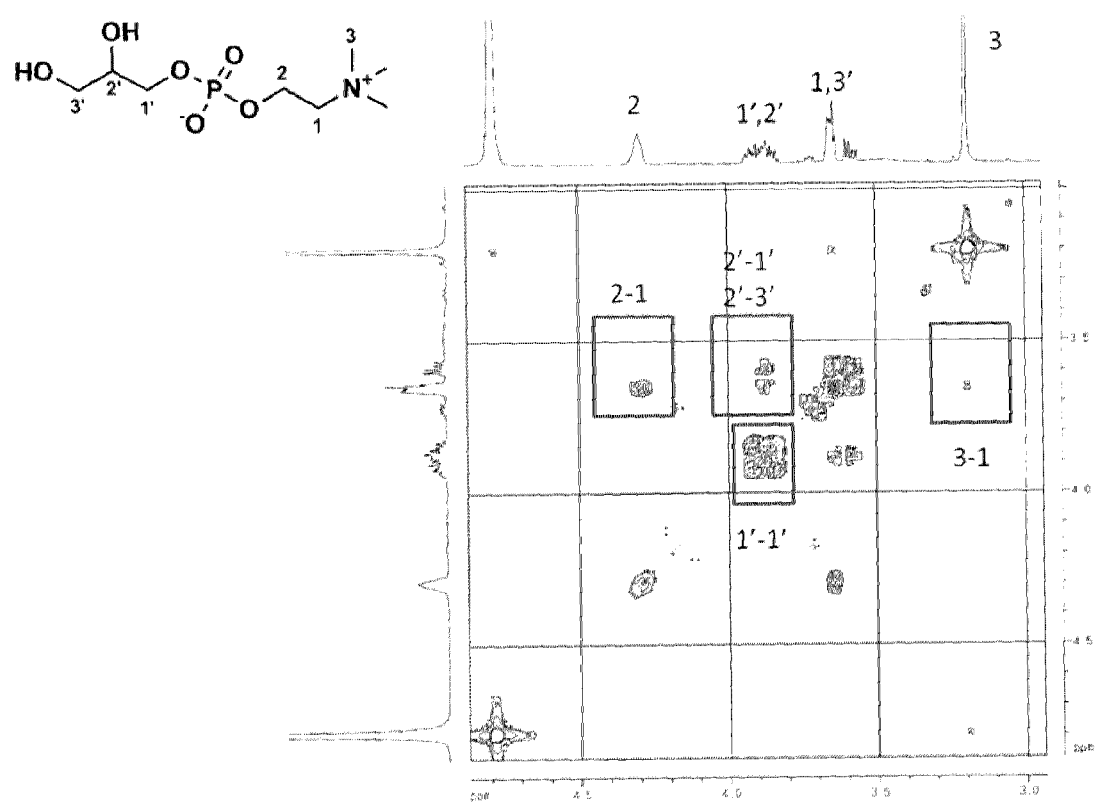
FIG. 17 is a 2-dimensional COSY-NMR spectrum of the highly-enriched compound shown in FIG. 13 (Example 4)
Figure 18:
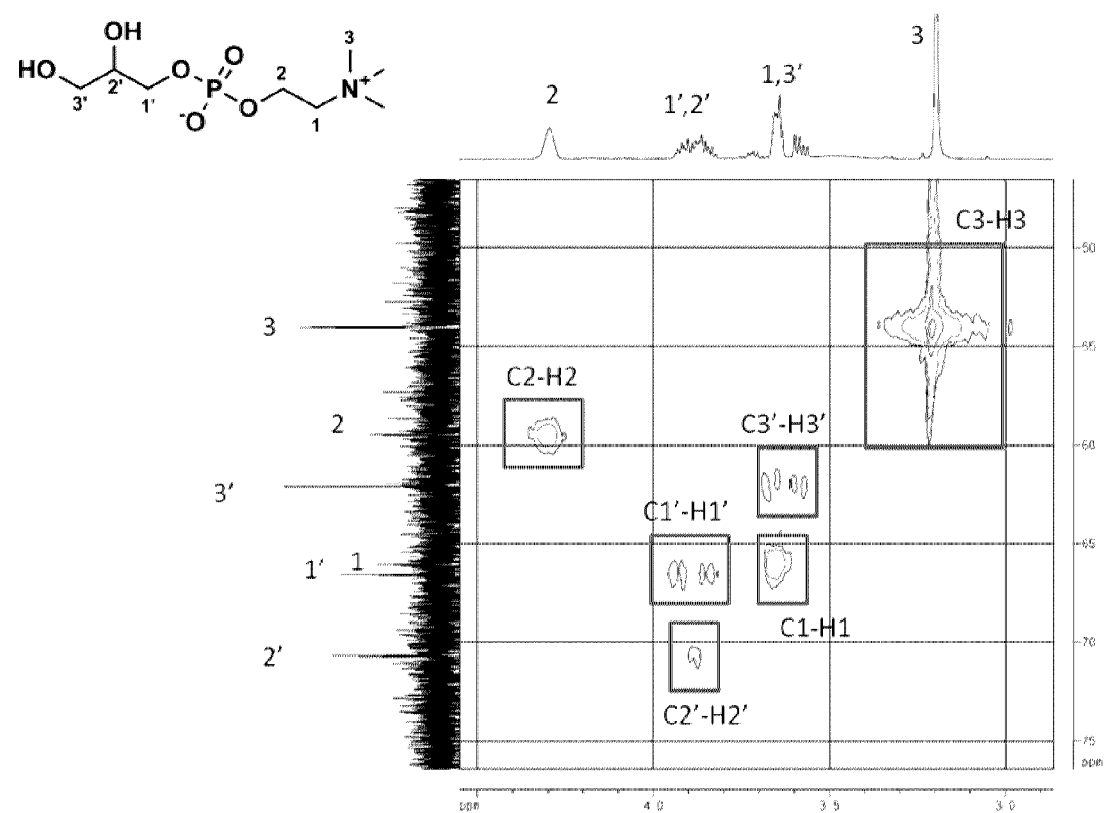
FIG. 18 is a 2-dimensional QC correlation of the $^1$H-NMR and $^{13}$C-NMR spectra of the highly-enriched compound shown in FIG. 13 (Example 4)

Band A was subjected to acylation by the addition of about 0.2 mL of acetic acid anhydride in about 0.6 mL of pyridine. The mixture was allowed to stand at about room temperature for a period of about 16 hours. The mixture was then concentrated under a vacuum to remove any excess pyridine and acetic acid anhydride. The concentrated product was dissolved in deuterated methanol to provide a crude acetylated product that was analyzed by $^1$H-NMR. Results are shown in FIG. 11. The crude acetylated product was dissolved in a solvent of about 20% methanol in dichloromethane (solvent A). A white solid was obtained after washing the crude acetylated solvent solution with several portions 2-mL aliquots of solvent A, after which the solution was analyzed by $^1$H-NMR (FIG. 12). The combined solvent A solution was loaded onto a silica gel column and eluted first with 100 mL of fresh solvent A and then with 200 mL of pure methanol. The silica gel chromatograph yielded four fractions. Fraction 4, eluted with 100% methanol, was found to be a highly-enriched compound (FIG. 13). Fraction 4 was prepared for 1-dimensional and 2-dimensional NMR analyses (Bruker 500 MHz spectrometer, in D$_2$O). The results of: (a) $^1$H-NMR analysis are shown in FIG. 14; (2) $^{13}$C-NMR are shown in FIG. 15; (c) APT analysis are shown in FIG. 16; (d) 2-dimensional COSY $^1$H-NMR-$^1$H-NMR correlation is shown in FIG. 17; and (e) 2-dimensional QC $^1$H-NMR-$^{13}$C-NMR correlation is shown in FIG. 18).

Based on above NMR spectroscopy and the resulting data, the structure of the fourth fraction 4 was identified as GPC. The $^{13}$C-NMR (proton-decoupled) analysis of the fourth fraction provides good agreement with the literature data for GPC in D$_2$O.

Example 5

Isolation of GPC by Acetone Extraction of Thin Stillage

Figure 19:
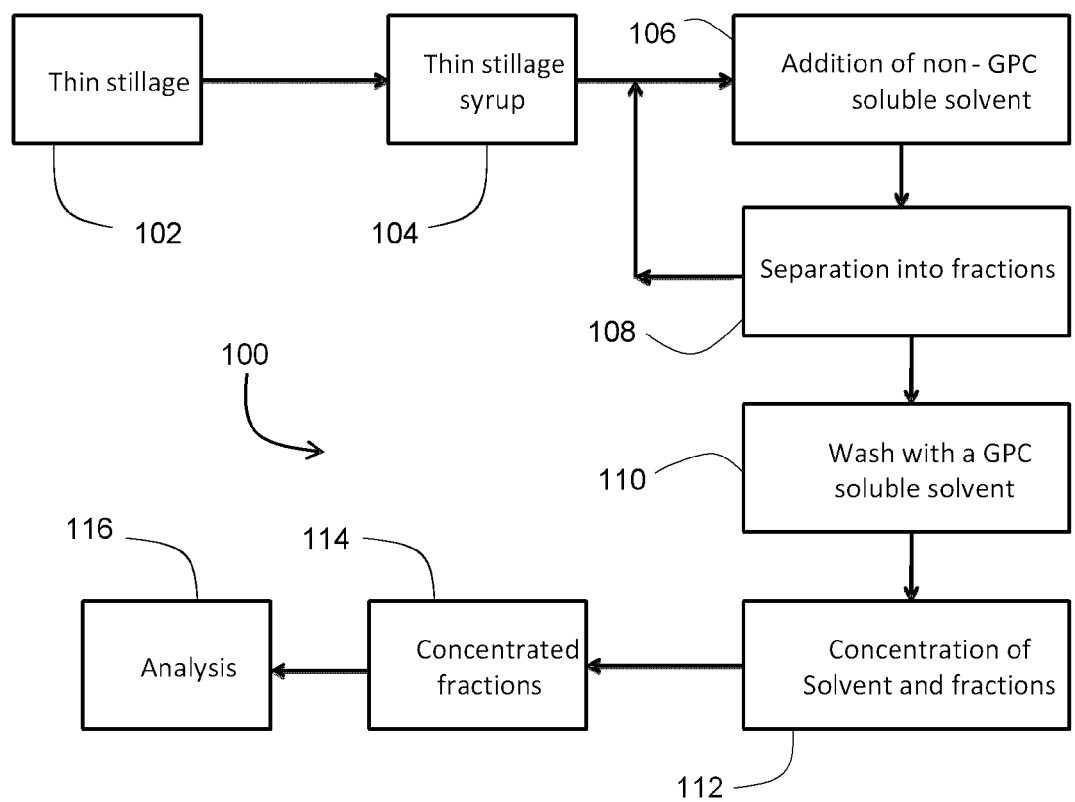
FIG. 19 is a flow chart showing an exemplary method of the present invention for extraction of glycerophosphorylcholine from thin stillage (Example 5)

FIG. 19 shows an exemplary method 100 for the recovers of GPC from thin stillage 102. Thin stillage 102 was dried using methods known in the art to provide a thin stillage syrup 104. A ketone solvent, in which GPC is not soluble, was added to the thin stillage syrup 106, and the resulting mixture was separated into a plurality of fractions 10. These fractions comprised solids and liquids. This process was repeated several times. Each of the fractions 108 was then washed with a solvent in which GPC is soluble 110, and the resulting solvent-fraction mixtures 112 were dried and yielded a plurality of concentrated fractions 114. These fractions were then subjected to NMR analysis 116.

Thin stillage (about 140.5 g, wet weight) was evaporated wider vacuum at a temperature of about 65° C. to yield a concentrated solution (16.5 g in total weight) which contained about 7% (w/w) water based on about a 5% (w/w) dried thin stillage syrup in total wet thin stillage. A portion of the concentrated solution (about 3.025 g. containing about 1,260 of dried syrup) was mixed with 10 mL of acetone solvent and the mixture was continuously stirred for about one hour to yield a brown viscous syrup. The resulting brown viscous syrup was separated by filtration wider a vacuum using a Buchner funnel to yield liquid and solid fractions. The liquid fraction was rinsed several times with 10 mL of acetone to yield a clear brown acetone solution that was subsequently evaporated under vacuum yielding a brown liquid fraction A (about 0.374 g). The solid fraction A was produced from the brown viscous syrup. A portion of solid fraction A was mixed with acetone and stirred continuously for a period of about an hour. The mixture was then separated by filtration under vacuum through a Buchner funnel to yield a second liquid fraction B. The liquid fraction was rinsed with 10 mL of fresh acetone then evaporated under vacuum to yield a second brown liquid fraction B (about 0.0695 g) The remaining portion of dried solid fraction A was mixed with methanol and was continuously stirred for about an hour, and then the mixture was subsequently separated by filtration under vacuum through a Buchner funnel to yield a third liquid fraction C and a second solid fraction B. Solid fraction B was rinsed with methanol, and the resulting liquid residue fraction was combined with the liquid methanol fraction and the mixture was evaporated under vacuum to yield a brown liquid fraction C (about 0.5573 g). The dried solid B fraction (about 0.2519 g) and liquids (liquids A, B and C) were analyzed with $^1$H-NMR as described previously (FIGS. 20, 21, 22, 23, respectively).

Figure 20:
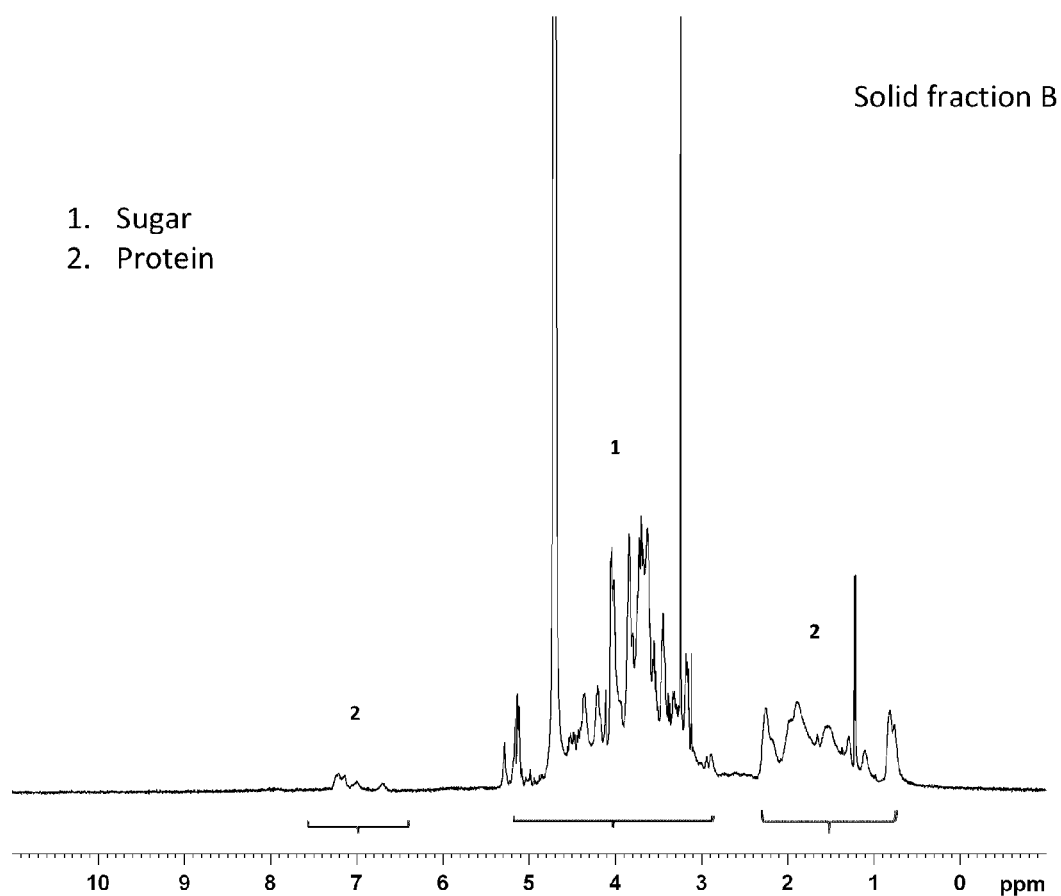
FIG. 20 is a $^1$H-NMR spectrum of a solids fraction B produced by an exemplary method of the present invention for recovery of α-glycerylphosphorylcholine from thin stillage (Example 5)
Figure 21:
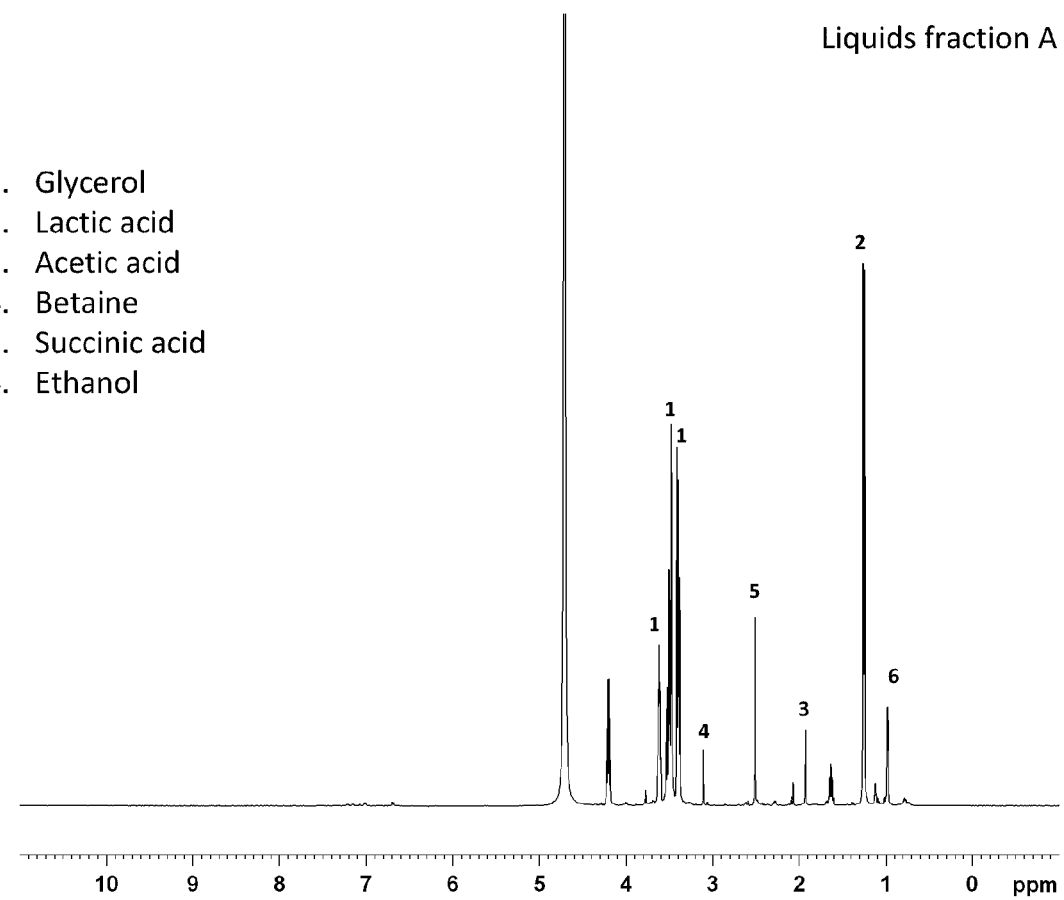
FIG. 21 is a $^1$H-NMR spectrum of a liquids fraction A produced by an exemplary method of the present invention for recovery of α-glycerylphosphorylcholine from thin stillage (Example 5)
Figure 22:
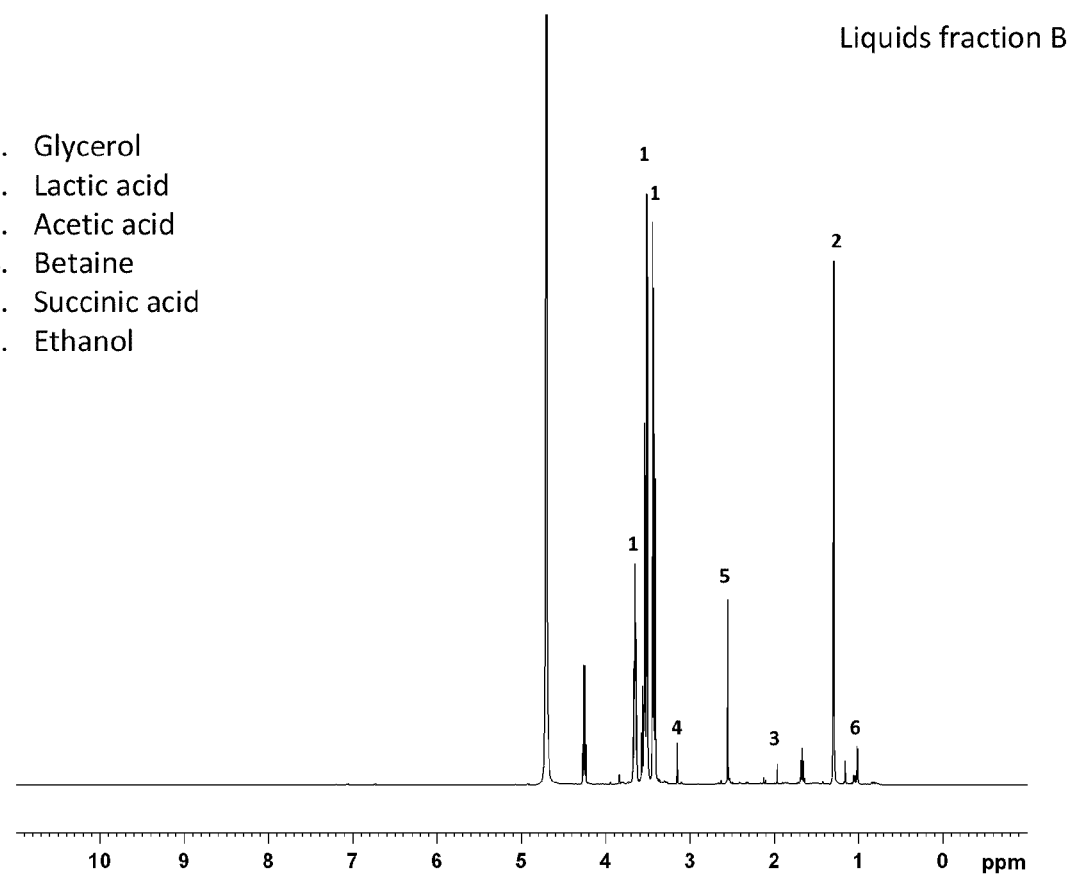
FIG. 22 is a $^1$H-NMR spectrum of a liquids fraction B produced by an exemplary method of the present invention for recover) of α-glycerylphosphorylcholine from thin stillage (Example 5)
Figure 23:
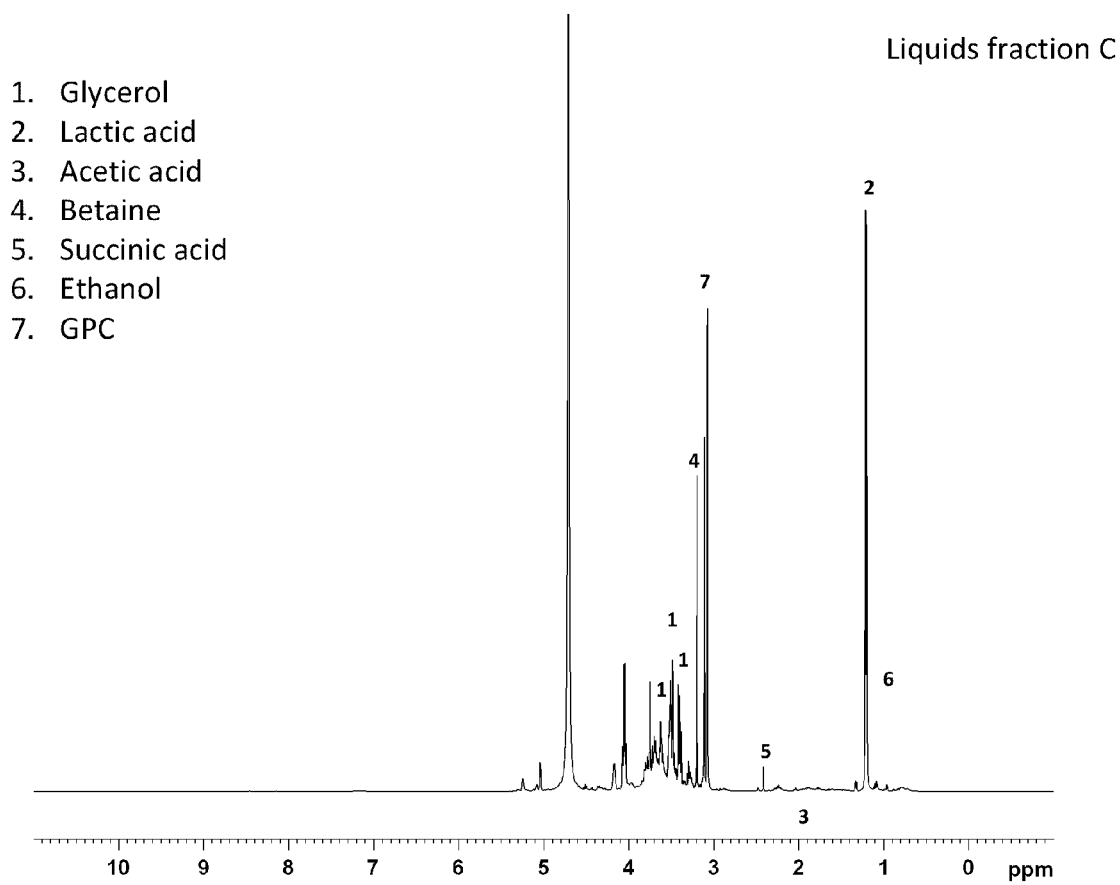
FIG. 23 is a $^1$H-NMR spectrum of a liquids fraction C produced by an exemplary method of the present invention for recovery of α-glycerylphosphorylcholine from thin stillage (Example 5)

The major parts of the solid fraction B may be sugars, whereas the minor components could be protein, based on $^1$H-NMR spectra (FIG. 20). Liquids A and B (FIGS. 21, 22) were composed of glycerol, lactic acid, acetic acid and trace amounts of betaine. Liquid B contained a lower ratio of betaine phosphate and lactic acid compared to glycerol than the ratio of those same components of liquid A. Liquid C produced by methanol extraction after two acetone extractions was composed of a high concentrations of GPC, as well as betaine and lactic acid (FIG. 23). The molar ratio of GPC to betaine for Liquid C was about 1.4:1 whereas the molar ratio for thin stillage syrup that was extracted with straight methanol is about 1:1. These results indicate that the use of an acetone solvent in the extraction of compounds from thin stillage is capable of removing glycerol, a portion of the lactic acid and acetic acid, and a small portion of betaine that is present in thin stillage. The results further indicate that acetone does not remove GPC from thin stillage. Acetone extraction enables the ability to form highly concentrated GPC solutions.

Example 6

Measurement of PEA Extraction Efficiency Using DCM

Commercial-grade PEA (about 103.0 mg) was mixed with pure water (about 10 mL). The resulting solution was extracted using the solvent DCM (about 5 mL).

The bottom layer of the aqueous solution, the organic phase, was collected and dried over anhydrous sodium sulfate. The solvent was removed under reduced pressure in a rotary evaporator to yield a colorless liquid (about 92.0 mg). A portion of the colorless solvent-free extract was dissolved in <0.4 mL deuterated chloroform ($CDCl_3$) and was subjected to proton NMR analysis.

The results indicated the presence of pure PEA with trace amounts of water. The recovered amount of PEA following the first extraction was 89% by weight.

The top layer of the aqueous solution was extracted with second portion of DCM (about 5 mL) using the same procedure. The recovery of PEA following the second extraction was about another 10% (about 10 mg) with an additional 1% (about 1 mg) recovered after the third extraction. The results show the total recovery of PEA was about 100% from a 1% PEA aqueous solution after three extractions by DCM using a ratio of 2:1 of water:DCM). DCM was used as solvent to extract PEA from thin stillage.

Example 7

Recovery of PEA from Thin Stillage Using DCM

Figure 24:
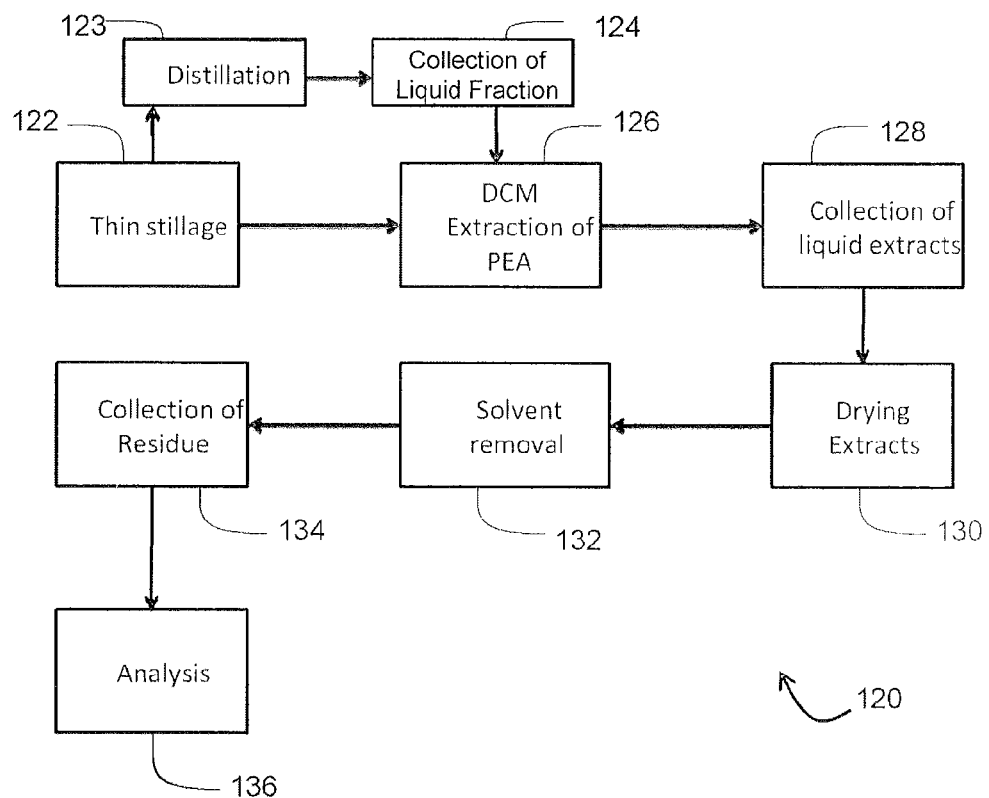
FIG. 24 is a flow chart showing an exemplary method of the present invention for extraction of 2-phenethanol from thin stillage (Example 7)

FIG. 24 shows an exemplary method 120 of the present invention for recovery of PEA from thin stillage process streams.

A portion of a thin stillage process stream 122 was distilled 123 to provide a thin stillage condensate 124. The condensate 124 was combined with the remaining portion of the thin stillage stream 122, and then was extracted with DCM 126. The DCM fractions were recovered 128 and dried 130 by solvent removal 132. The residues were collected and analysed.

Figure 25:
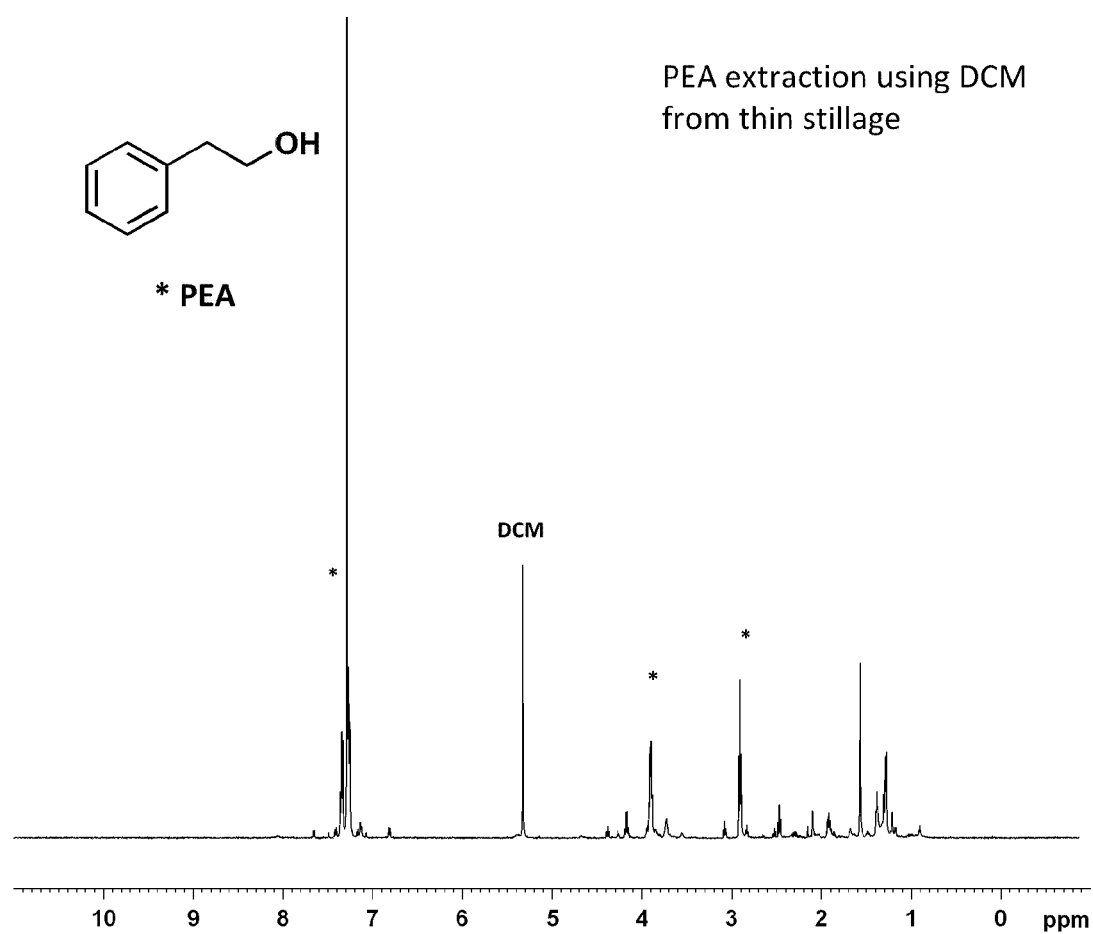
FIG. 25 is a proton-NMR spectrum showing the presence of 2-phenethanol in dichloromethane extracts prepared from thin stillage (Example 7)

In a first experiment, about 10 mL of thin stillage were directly extracted with three 10-mL aliquots of DCM following the process disclosed in Example 6. The organic phases were combined, then dried over anhydrous sodium sulfate after which, then the solvent was removed under reduced pressure in a rotary evaporator. The resulting extracts were prepared for proton NMR analysis. It was found that while the extracts contained several compounds, the major component present was PEA. Both proton-NMR spectral analysis (FIG. 25) and carbon-NMR spectral analysis showed similar spectra of that of commercially available PEA.

Figure 26:
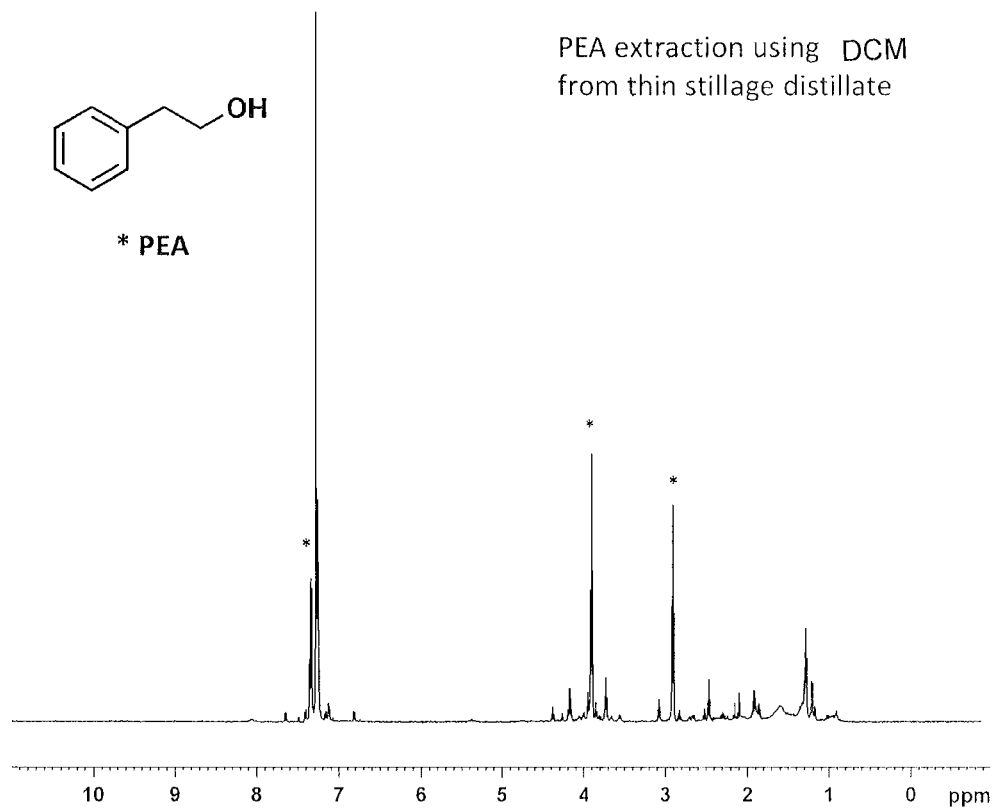
FIG. 26 is a proton-NMR spectrum showing the presence of 2-phenethanol in dichloromethane extracts prepared from distilled thin stillage (Example 7)

In a second experiment, condensed water from the distillation of thin stillage (about 10 mL) was extracted using DCM (about 5 mL×3) using the process outlined in Example 7. The combined organic phases were dried over anhydrous sodium sulfate and then the solvent was removed under reduced pressure in a rotary evaporator. The resulting extracts were prepared for proton NMR analysis. It was found that the extracts contained several compounds however, PEA was the major component identified (FIG. 26).

Example 8

Recovery of PEA from Thin Stillage Using Canola Oil and Isopropyl Alcohol

Figure 27:
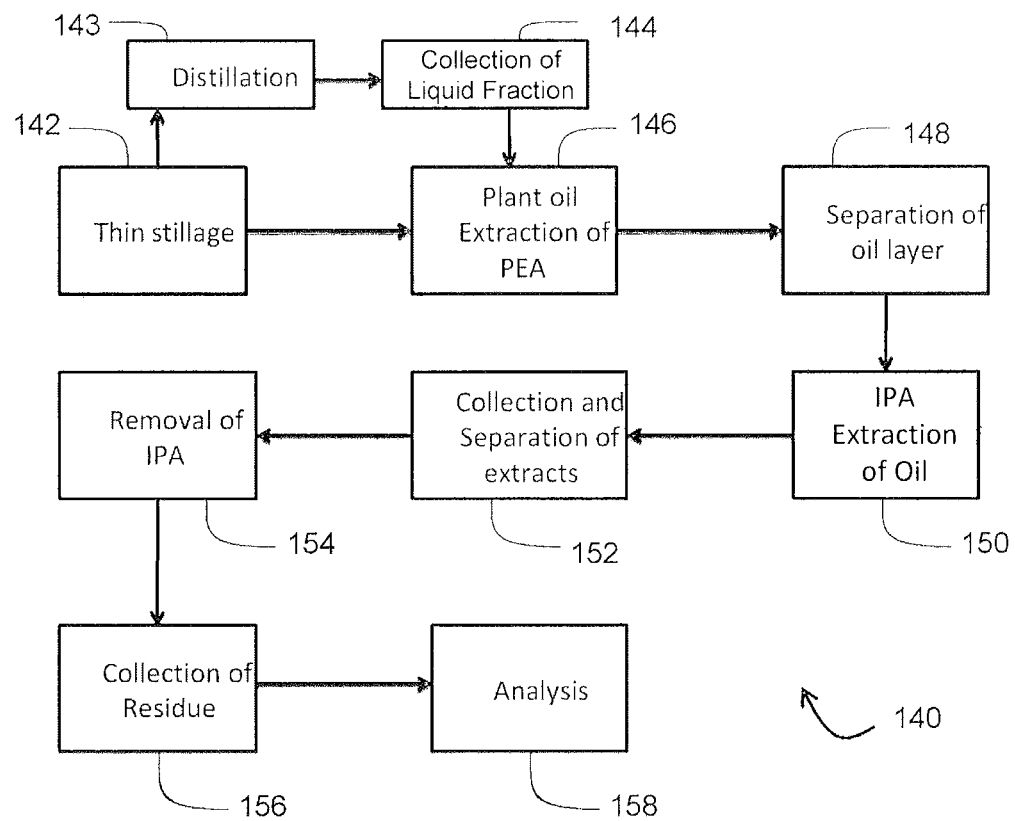
FIG. 27 is a flow chart showing an exemplary method of the present invention for recovery of 2-phenethanol from thin stillage with canola oil (Example 8)

FIG. 27 shows another exemplary method 140 of the present invention for recovery of PEA from thin stillage process streams.

A portion of a thin stillage process stream 142 was distilled 143 to remove any remaining traces of short-chain alcohols. The resulting stillage was separated into a liquid fraction 144 which was combined with the remaining portion of the thin stillage stream 142. The combined thin stillage streams were then commingled with canola oil 146, allowed to separate into an oil phase and aqueous phase, from which was recovered the oil phase 148. The oil phase was extracted several times with isopropyl alcohol (IPA) 150. Residual canola oil as separated from the IPA extracts 152 after which, the IPA as removed by evaporation in a rotary evaporator 154. The residues ere collected 156 and anal zed with proton-NMR spectroscopy 158.

Figure 28:
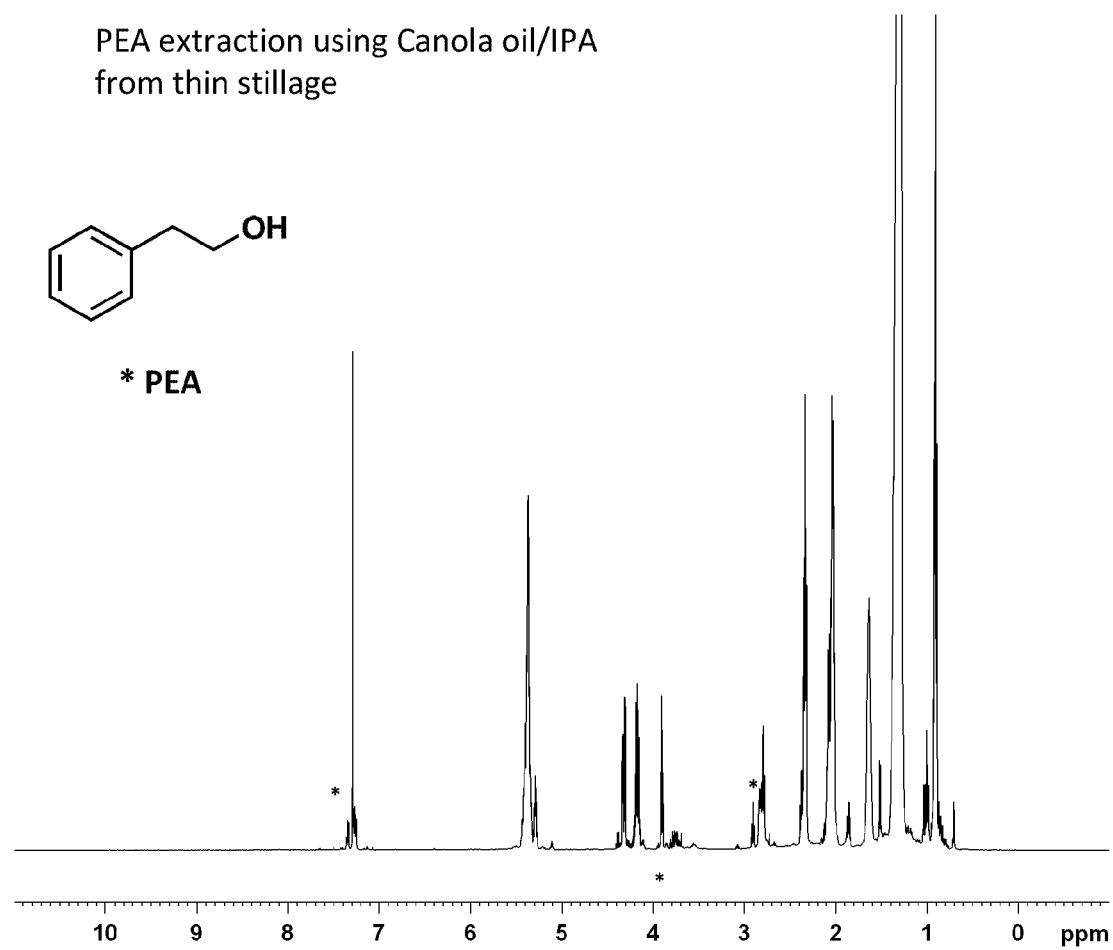
FIG. 28 is a proton-NMR spectrum showing the presence of 2-phenethanol in canola oil/IPA extracts prepared from thin stillage (Example 8)

In a first experiment, about 10-mL of thin stillage was directly extracted with about 2 mL of canola oil. The top layer of the mixture comprising canola oil and "cloud", was separated from the bottom layer and further extracted with isopropyl alcohol (1:1 v/v). The bottom layer of the canola oil phase became clear and the top isopropyl alcohol (IPA) phase was separated from the canola oil. The IPA top layer was recovered and the IPA removed under reduced pressure in a rotary evaporator. The resulting extracts were prepared for proton NMR analysis, NMR analysis confirmed that the extracts contained PEA, canola oil and trace amounts of IPA (FIG. 28). PEA was recovered using IPA and canola oil, both of which are food safe solvents.

Figure 29:
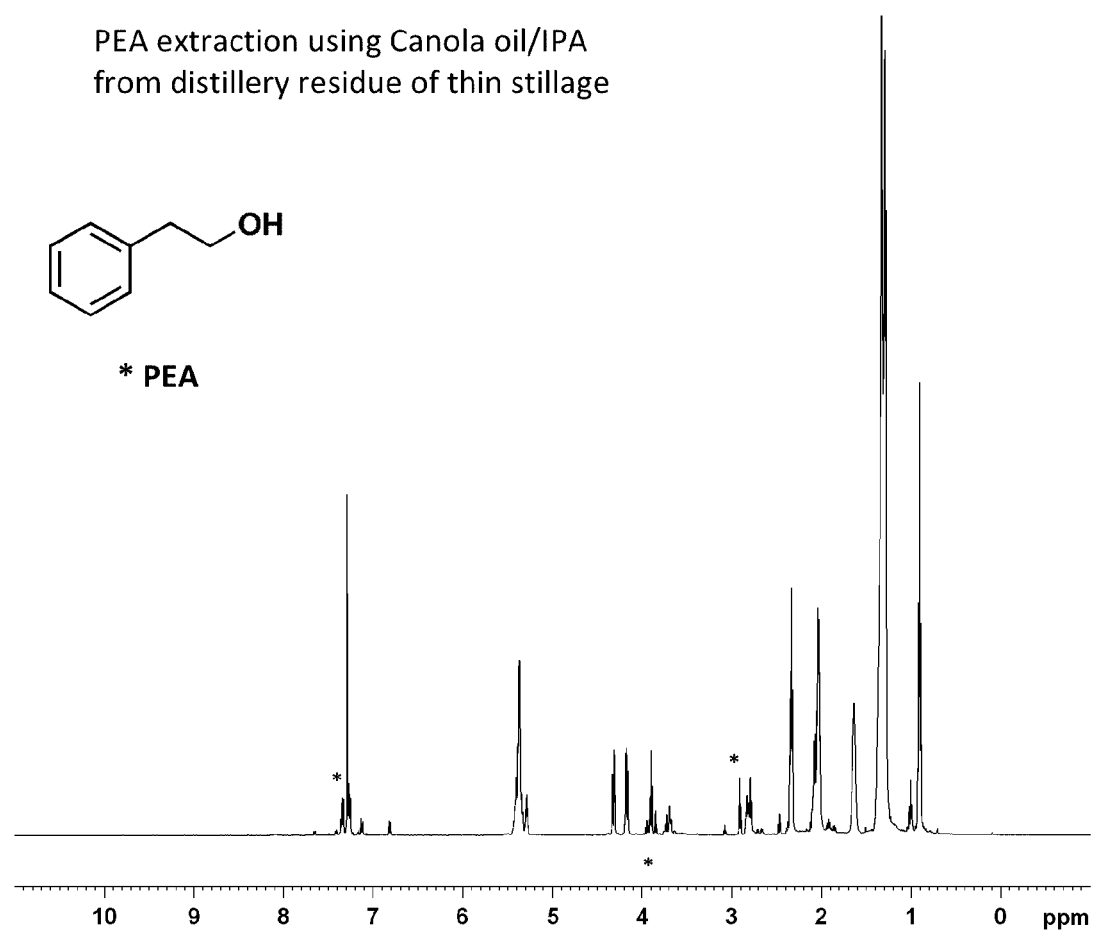
FIG. 29 is a proton-NMR spectrum showing the presence of 2-phenethanol in canola oil/IPA extracts prepared from distillery residue of thin stillage (Example 8)

In a second experiment, condensed water from the distillation of thin stillage (about 10 mL) was extracted with about 2 mL of canola oil. The top layer of the mixture (canola oil, cloud) was separated and further extracted with IPA (1:1 v/v). The bottom layer of the canola oil phase became clear and the top isopropyl alcohol (IPA) phase was separated from the canola oil. The IPA top layer was recovered and the IPA removed under reduced pressure in a rotary evaporator. The resulting extracts were prepared for proton NMR analysis. NMR analysis confirmed that the extracts contained PEA, canola oil and trace amounts of IPA (FIG. 29).

Example 9

Figure 30:
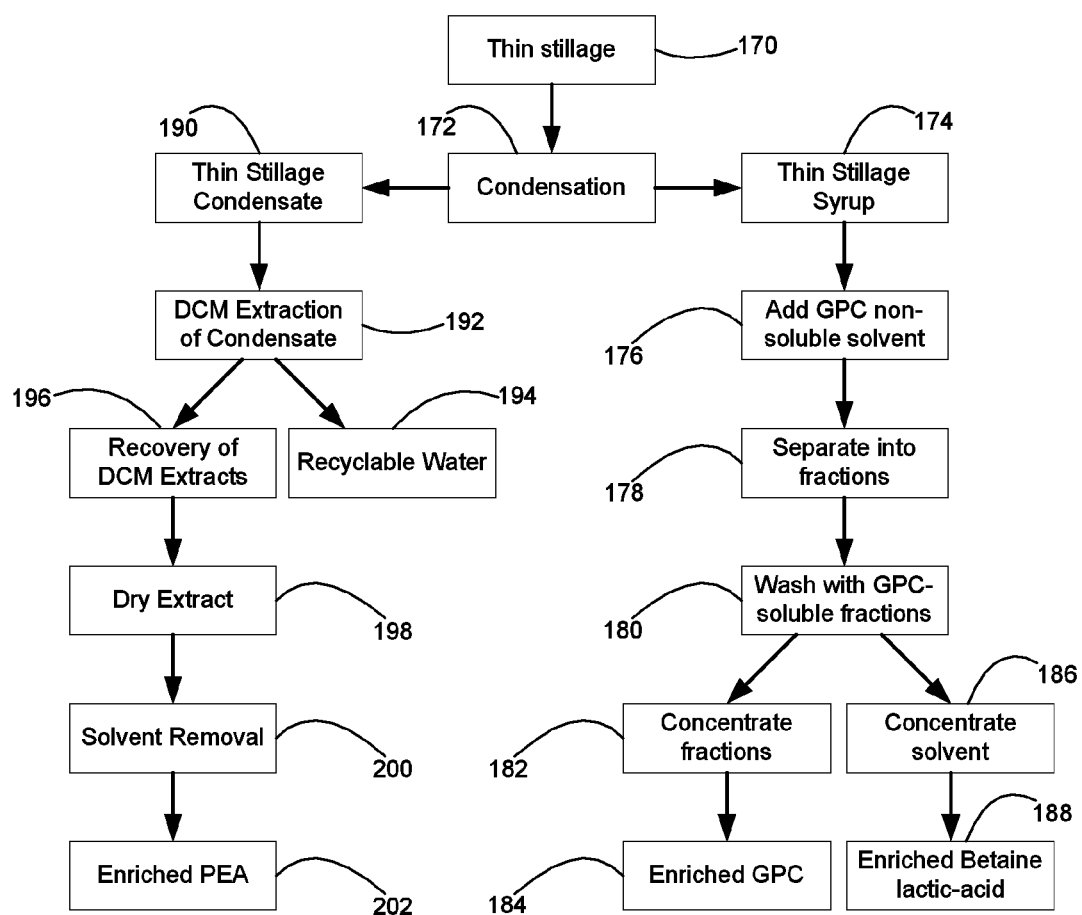
FIG. 30 is a flow chart showing an exemplary method of the present invention for recovery of recyclable water, glycerophosphorylcholine, 2-phenethanol and other fermentation co-products from thin stillage (Example 9)

Recovery of Recyclable Water from Thin Stillage by Removal of Organic Compounds FIG. 30 shows an exemplary method 168 of the present invention for recovery of recyclable water and multiple fermentation co-products from thin stillage process streams.

A thin stillage process stream 170 is separated by distillation 172 to provide a thin stillage condensate 190 and a thin stillage syrup 174. The thin stillage condensate 190 is extracted with DCM 192 after which, the DCM extracts 196 are separated from the aqueous fraction 194 which comprises recyclable ater 194. The DCM fractions are dried 198 after which the solvent is removed by evaporation 200 thereby producing a PEA-enriched residue fraction 202 that also contains acetic acid. The thin stillage syrup 174 is commingled with a solvent in which GPC is not soluble 176, and the resulting mixture is allowed to separate into fractions 178. The GPC-nonsolubilizing solvent removed and the remaining fraction 180 is washed several times with a GPC-solubilizing solvent. The GPC-containing fraction 182 is concentrated and comprises primarily GPC 184. The remaining fractions are collected 186 and dried down thereby producing residues 188 enriched with betaine and lactic acid.

Figure 31:
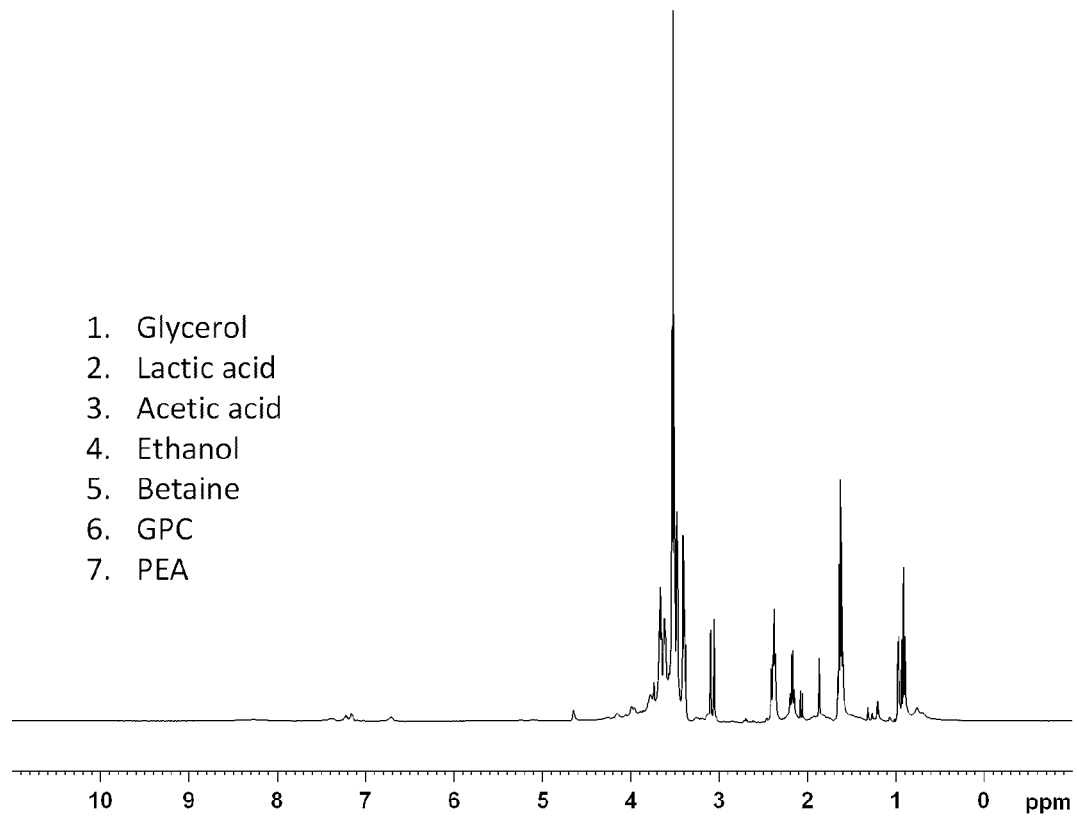
FIG. 31 is a $^1$H-NMR spectrum of thin stillage prior to processing with an exemplary method of the present invention (Example 9)
Figure 32:
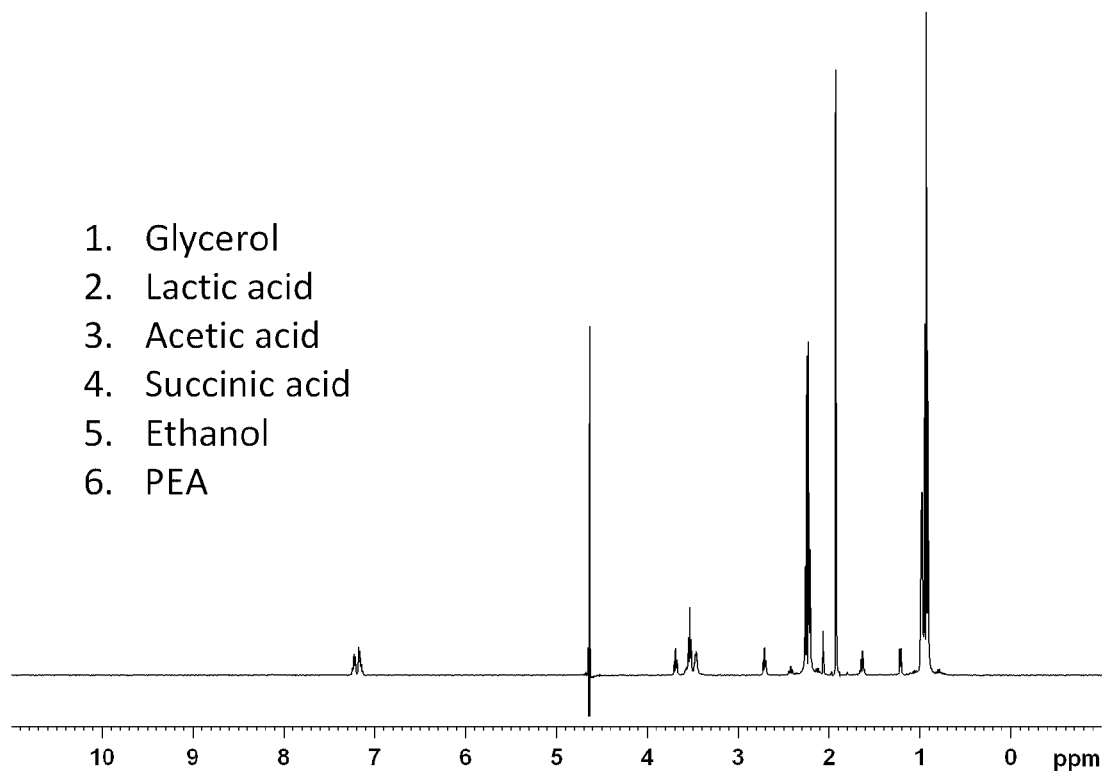
FIG. 32 is a $^1$H-NMR spectrum of thin stillage condensate recovered with the method used in FIG. 31 (Example 9)
Figure 33:
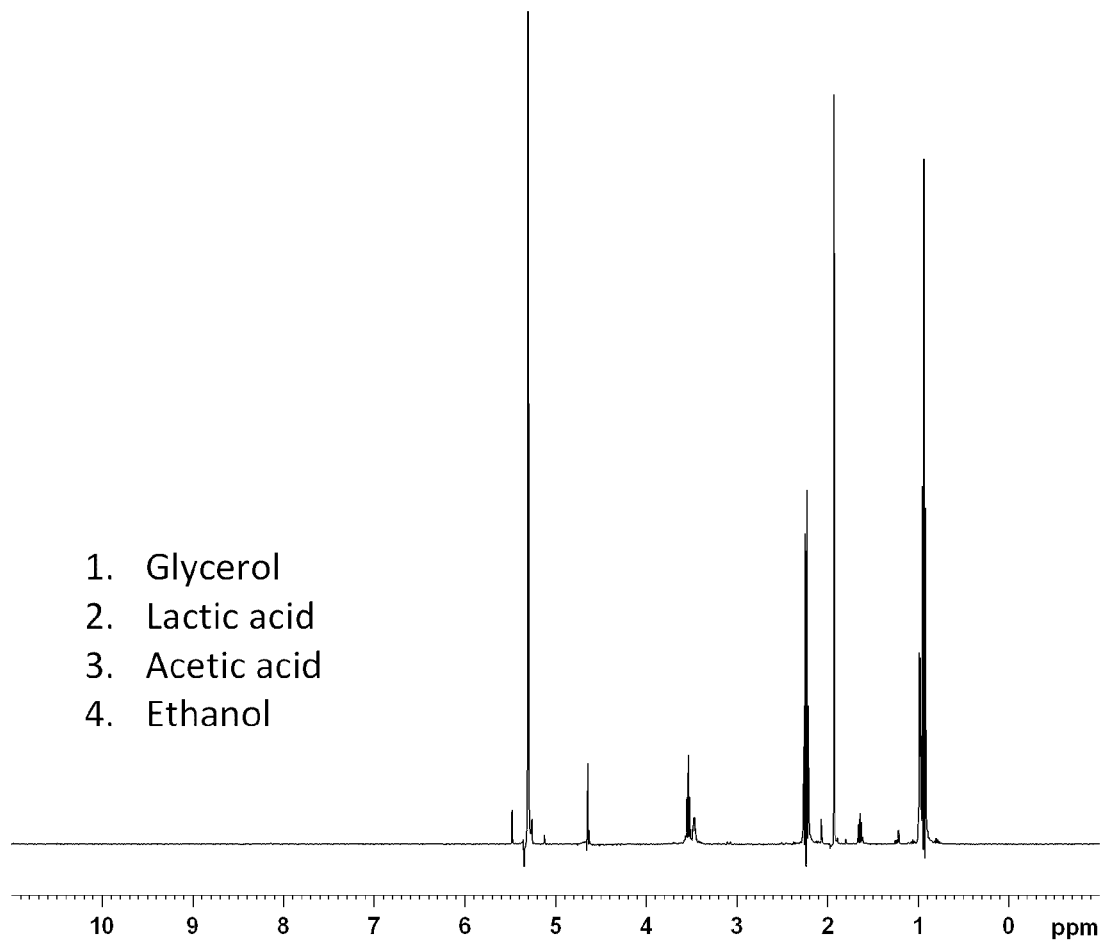
FIG. 33 is a $^1$H-NMR spectrum of recycled water recovered with the method used in FIG. 31 (Example 9)
Figure 34:
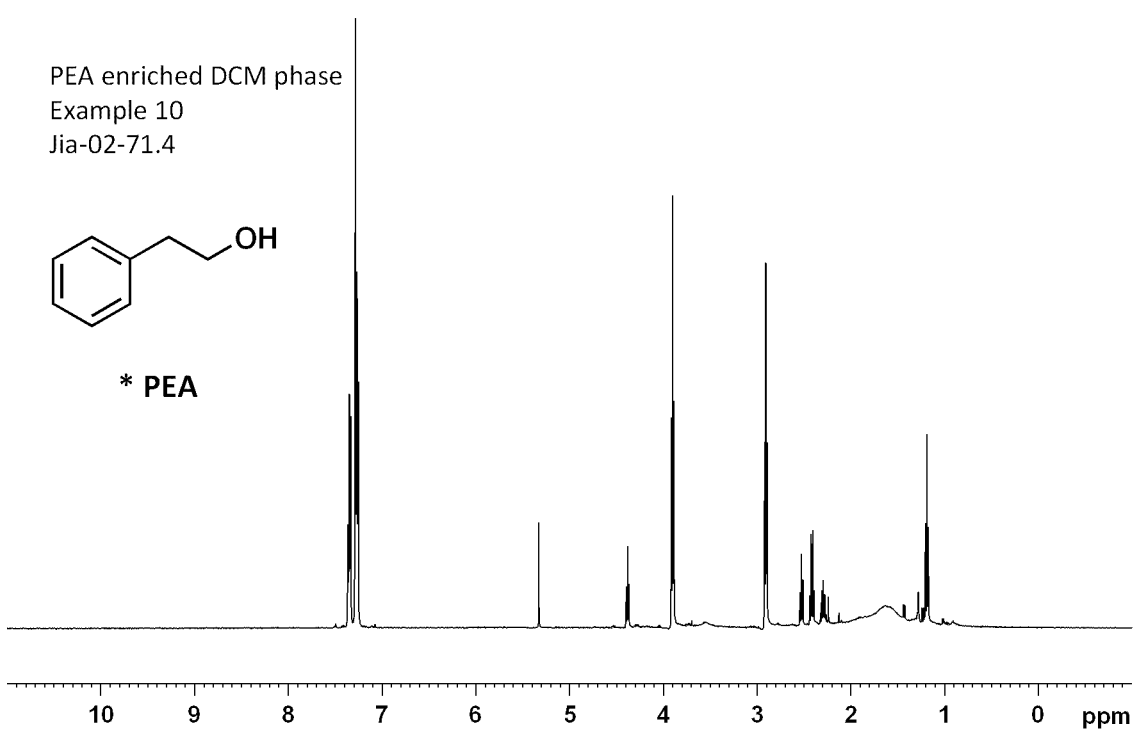
FIG. 34 is a $^1$H-NMR spectrum of an enriched 2-phenethanol fraction recovered with the method used in FIG. 31 (Example 9)
Figure 35:
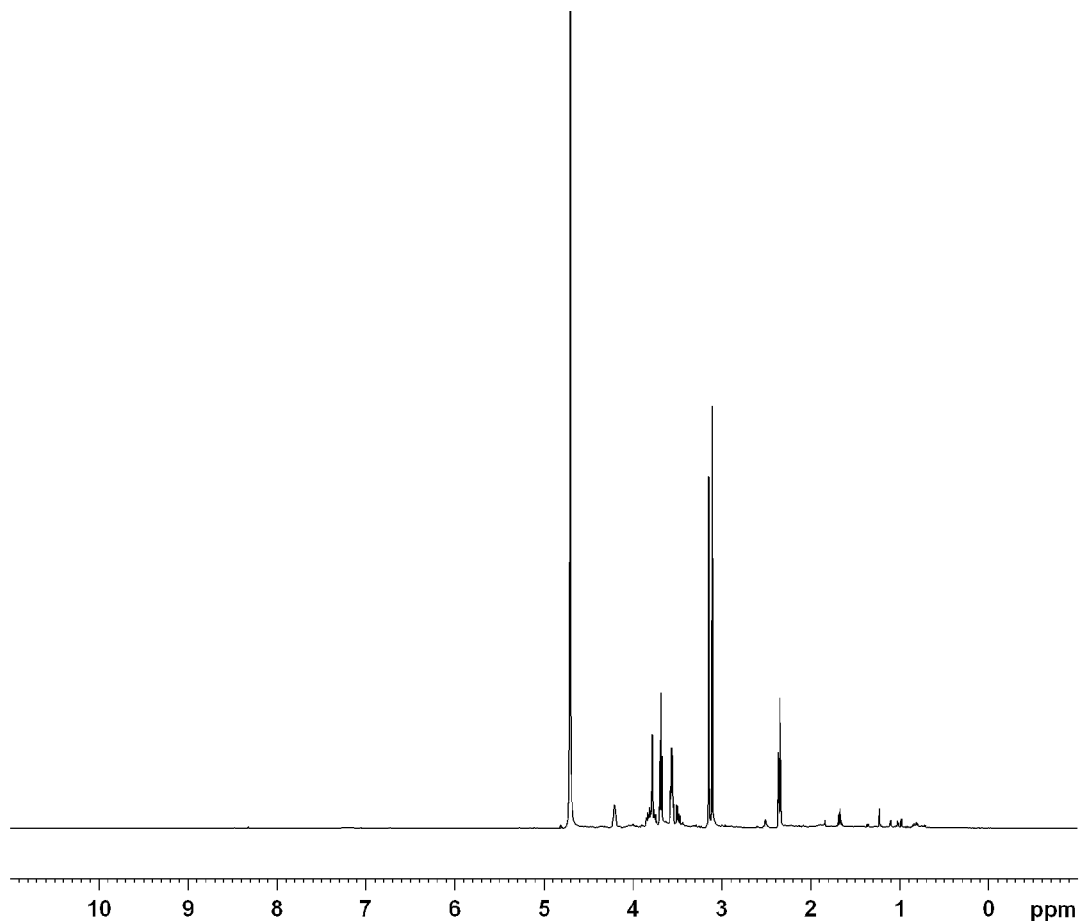
FIG. 35 is a $^1$H-NMR spectrum of an enriched α-glycerylphosphorylcholine residue recovered from thin stillage syrup with the method used in FIG. 31 (Example 9)

A thin stillage 172 was analyzed for the presence of fermentation co-products and was determined to comprise glycerol, lactic acid, acetic acid, ethanol, betaine, GPC and PEA (FIG. 31). The thin stillage 172 was separated into a thin stillage condensate 190 and a thin stillage syrup 174. The thin stillage condensate 190 was found to comprise glycerol, lactic acid, acetic acid, succinic acid, ethanol, and PEA (FIG. 32). After extraction of the thin stillage condensate with DCM 192, the recovered water 194 was found to comprise small amounts of glycerol and lactic acid, and moderate amounts of acetic acids and ethanol (FIG. 33). Those skilled in these arts would understand the processes and apparatus commonly available for removing acetic acid and ethanol from the recovered water. PEA was not detected in the recovered water 194 (FIG. 33). After the DCM extracts 196 were desolventized 200, the residues 202 were enriched with PEA (FIG. 34). After the thin stillage syrup 174 was processed as shown in FIG. 30, the residues were found to be enriched with GPC (FIG. 35).

The invention claimed is:

1. A method for recovering organic chemicals from thin stillage comprising:
   separating the thin stillage into a thin stillage condensate and a thin stillage syrup; and
   separating and recovering organic compounds from the thin stillage syrup by commingling the thin stillage syrup with a polar solvent; wherein the commingling of the thin stillage syrup with a polar solvent provides insoluble compounds comprising GPC, and soluble compounds selected from one of more of glycerol, succinic acid, acetic acid, 1,3-propanediol, lactic acid and betaine and the insoluble compounds are recovered by filtration and drying and the soluble compounds are recovered by removal of the polar solvent and drying.

2. The method of claim 1, wherein the solvent in which GPC is not soluble is a ketone solvent.

3. The method of claim 2, wherein the solvent in which GPC is not soluble is acetone.

4. The method of claim 1, wherein the thin stillage is separated into the thin stillage condensate and the thin stillage syrup by distillation.

5. The method of claim 1, further comprising commingling of the thin stillage condensate with a solvent to solubilize organic compounds or an oil.

6. The method of claim 5, wherein the solvent to solubilize organic compounds in the thin stillage condensate is dichloromethane (DCM).

7. The method of claim 6, wherein the DCM fraction is dried and desolventized to provide a 2-phenylethanol (PEA)-enriched residue.

8. The method of claim 7, wherein the PEA-enriched residue further comprises acetic acid.

9. The method of claim 5, wherein the oil is canola oil.

10. The method of claim 5, wherein the commingling of the thin stillage condensate with a solvent to solubilize organic compounds or an oil provides a solvent or an oil fraction and a water fraction which are separated and the water is recycled.

11. The method of claim 10, wherein the recycled water is recycled into one of a saccharification process, a fermentation process and a simultaneous saccharification and fermentation process.

* * * * *